United States Patent
Stenzler et al.

(10) Patent No.: US 10,207,193 B2
(45) Date of Patent: Feb. 19, 2019

(54) OPTICAL TRACKING SYSTEM FOR AUTOMATION OF AMUSEMENT PARK ELEMENTS

(71) Applicant: Universal City Studios LLC, Universal City, CA (US)

(72) Inventors: Paula Stenzler, Orlando, FL (US); Robert J. Cortelyou, Orlando, FL (US); Brian B. McQuillian, Orlando, FL (US); Christopher Oliver, Orlando, FL (US); Steven C. Blum, Orlando, FL (US); Justin M. Schwartz, Orlando, FL (US); Bradley D. Okeson, Orlando, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 634 days.

(21) Appl. No.: 14/717,989

(22) Filed: May 20, 2015

(65) Prior Publication Data
US 2015/0336013 A1 Nov. 26, 2015

Related U.S. Application Data

(60) Provisional application No. 62/001,551, filed on May 21, 2014.

(51) Int. Cl.
*G06K 9/00* (2006.01)
*G06K 9/32* (2006.01)
(Continued)

(52) U.S. Cl.
CPC .............. *A63G 31/00* (2013.01); *G05B 15/02* (2013.01); *G06K 9/00771* (2013.01); *G06K 9/3216* (2013.01); *G08B 21/22* (2013.01)

(58) Field of Classification Search
CPC ...... G06F 3/0425; G06F 3/017; G06F 3/0304; G06F 3/011; A63F 13/213;
(Continued)

(56) References Cited

U.S. PATENT DOCUMENTS 2,170,160 A 8/1939 Bailey
3,740,562 A * 6/1973 Fertig ................... G01N 21/55
250/221

(Continued)

FOREIGN PATENT DOCUMENTS

CN 201189396 2/2009
EP 1578130 9/2005
(Continued)

OTHER PUBLICATIONS

Chen, X.; "Capturing Fast Motion with Consumer Grade Unsynchronized Rolling-Shutter Cameras"; The University of British Columbia 2012, pp. 1-85.
(Continued)

*Primary Examiner* — Scott L Jarrett
(74) *Attorney, Agent, or Firm* — Fletcher Yoder P.C.

(57) ABSTRACT

A dynamic signal to noise ratio tracking system enables detection of people within the field of view of the tracking system. The tracking system may include an emitter configured to emit electromagnetic radiation within an area, a detector configured to detect electromagnetic radiation reflected back from people and/or objects within the area, and a control unit configured to evaluate signals from the detector and control various automated amusement park equipment as a result of this evaluation.

20 Claims, 18 Drawing Sheets

(51) Int. Cl.
  *A63G 31/00* (2006.01)
  *G05B 15/02* (2006.01)
  *G08B 21/22* (2006.01)

(58) Field of Classification Search
  CPC ............ A63F 2300/1087; A63F 13/06; G06K
    9/00771; G06K 9/3216; G06T 7/20;
    G06T 2207/10048
  See application file for complete search history.

(56) References Cited

U.S. PATENT DOCUMENTS

| | | | |
|---|---|---|---|
| 3,743,217 A | 7/1973 | Turck | |
| 4,254,433 A | 3/1981 | Dewar, Jr. et al. | |
| 4,662,756 A | 5/1987 | Duran, Jr. | |
| 4,855,915 A | 8/1989 | Dallaire | |
| 5,210,604 A * | 5/1993 | Carpenter | G06F 3/0304 348/61 |
| 5,365,266 A * | 11/1994 | Carpenter | G06F 3/0304 348/61 |
| 5,682,331 A | 10/1997 | Berlin | |
| 5,809,161 A | 9/1998 | Auty et al. | |
| 5,956,525 A * | 9/1999 | Minsky | A41H 1/02 33/15 |
| 6,008,800 A | 12/1999 | Pryor | |
| 6,144,366 A * | 11/2000 | Numazaki | G06F 3/011 345/156 |
| 6,176,837 B1 | 1/2001 | Foxlin | |
| 6,342,706 B1 * | 1/2002 | Takeda | G08B 13/184 250/200 |
| 6,474,159 B1 | 11/2002 | Foxlin et al. | |
| 6,665,079 B1 | 12/2003 | Tocci et al. | |
| 6,711,280 B2 * | 3/2004 | Stafsudd | G06K 9/3241 348/622 |
| 6,720,949 B1 | 4/2004 | Pryor et al. | |
| 6,761,637 B2 | 7/2004 | Weston et al. | |
| 6,784,826 B2 * | 8/2004 | Kane | A61B 5/1038 342/118 |
| 6,831,603 B2 | 12/2004 | Menache | |
| 6,946,643 B1 * | 9/2005 | Fayfield | G01V 8/14 250/221 |
| 6,950,021 B2 * | 9/2005 | Butler | G01S 13/04 340/446 |
| 6,967,566 B2 | 11/2005 | Weston et al. | |
| 7,084,859 B1 | 8/2006 | Pryor | |
| 7,089,148 B1 | 8/2006 | Bachmann et al. | |
| 7,098,891 B1 * | 8/2006 | Pryor | G06F 3/011 345/158 |
| 7,184,022 B2 | 2/2007 | Xie et al. | |
| 7,257,237 B1 | 8/2007 | Luck et al. | |
| 7,259,747 B2 * | 8/2007 | Bell | G03B 21/26 345/156 |
| 7,307,617 B2 | 12/2007 | Wilson et al. | |
| 7,356,172 B2 | 4/2008 | Fan et al. | |
| 7,395,181 B2 | 7/2008 | Foxlin | |
| 7,401,783 B2 | 7/2008 | Pryor | |
| 7,445,550 B2 | 11/2008 | Barney et al. | |
| 7,466,843 B2 * | 12/2008 | Pryor | B60K 35/00 382/103 |
| 7,489,303 B1 | 2/2009 | Pryor | |
| 7,500,917 B2 | 3/2009 | Barney et al. | |
| 7,502,126 B2 | 3/2009 | Ong | |
| 7,505,033 B2 * | 3/2009 | Guo | G06F 3/0317 345/156 |
| 7,519,537 B2 | 4/2009 | Rosenberg | |
| 7,618,323 B2 | 11/2009 | Rothschild et al. | |
| 7,623,115 B2 | 11/2009 | Marks | |
| 7,652,687 B2 * | 1/2010 | Sorensen | G07C 9/00 348/150 |
| 7,671,851 B1 | 3/2010 | Pryor | |
| 7,704,135 B2 | 4/2010 | Harrison, Jr. | |
| 7,739,925 B2 * | 6/2010 | Foster | A63G 4/00 73/865.8 |
| 7,755,608 B2 | 7/2010 | Chang et al. | |
| 7,775,439 B2 | 8/2010 | Kimber et al. | |
| 7,775,883 B2 * | 8/2010 | Smoot | A63F 13/00 463/30 |
| 7,843,429 B2 | 11/2010 | Pryor | |
| 7,850,527 B2 | 12/2010 | Barney et al. | |
| 7,854,655 B2 | 12/2010 | Mao et al. | |
| 7,863,551 B2 | 1/2011 | Bang et al. | |
| 7,874,918 B2 | 1/2011 | Osnato et al. | |
| 7,896,742 B2 | 3/2011 | Weston et al. | |
| 7,905,769 B1 | 3/2011 | Harrison, Jr. | |
| 7,918,733 B2 | 4/2011 | Zalewski et al. | |
| 7,927,216 B2 | 4/2011 | Ikeda et al. | |
| 7,996,793 B2 | 8/2011 | Latta et al. | |
| 8,040,328 B2 | 10/2011 | Smith et al. | |
| 8,058,975 B2 | 11/2011 | Barnardo et al. | |
| 8,209,134 B2 | 6/2012 | Parker et al. | |
| 8,228,305 B2 | 7/2012 | Pryor | |
| 8,248,367 B1 | 8/2012 | Barney et al. | |
| 8,287,374 B2 | 10/2012 | Pryor | |
| 8,306,635 B2 * | 11/2012 | Pryor | B60K 35/00 482/5 |
| 8,538,562 B2 | 9/2013 | Pryor et al. | |
| 8,553,079 B2 | 10/2013 | Pryor | |
| 9,026,392 B2 * | 5/2015 | Staats | A61B 5/1072 702/97 |
| 9,201,716 B1 * | 12/2015 | Leonard | G06F 9/546 |
| 9,316,593 B2 * | 4/2016 | Switkes | G01N 21/78 |
| 9,513,606 B1 * | 12/2016 | Larsen | G05B 9/02 |
| 9,616,350 B2 * | 4/2017 | Stenzler | A63G 33/00 |
| 9,649,551 B2 * | 5/2017 | Maharbiz | A63F 3/00214 |
| 9,740,922 B2 * | 8/2017 | Csaszar | G06K 9/00355 |
| 9,773,163 B2 * | 9/2017 | Carey | H04N 7/183 |
| 2001/0015548 A1 * | 8/2001 | Breed | B60R 21/235 280/735 |
| 2002/0048388 A1 * | 4/2002 | Hagihara | G06T 7/60 382/107 |
| 2003/0048926 A1 | 3/2003 | Watanabe | |
| 2003/0069077 A1 | 4/2003 | Koreienek et al. | |
| 2003/0159300 A1 * | 8/2003 | Moss | A61B 5/1072 33/512 |
| 2004/0102247 A1 | 5/2004 | Smoot et al. | |
| 2004/0166937 A1 | 8/2004 | Kopera et al. | |
| 2004/0178955 A1 | 9/2004 | Menache et al. | |
| 2005/0073411 A1 * | 4/2005 | Butler | G01S 13/04 340/552 |
| 2005/0128578 A1 * | 6/2005 | Sugawara | H04N 5/74 359/443 |
| 2005/0143173 A1 | 6/2005 | Barney et al. | |
| 2006/0030385 A1 | 2/2006 | Barney et al. | |
| 2006/0067572 A1 | 3/2006 | White et al. | |
| 2006/0125691 A1 | 6/2006 | Menache et al. | |
| 2006/0154726 A1 | 7/2006 | Weston et al. | |
| 2006/0256081 A1 | 11/2006 | Zalewski et al. | |
| 2006/0282873 A1 | 12/2006 | Zalewski et al. | |
| 2006/0287087 A1 | 12/2006 | Zalewski et al. | |
| 2007/0047742 A1 * | 3/2007 | Taenzer | H04R 3/005 381/92 |
| 2007/0248287 A1 * | 10/2007 | Chao | G06T 7/13 382/300 |
| 2007/0259594 A1 | 11/2007 | Galbiati et al. | |
| 2007/0265075 A1 | 11/2007 | Zalewski | |
| 2008/0013826 A1 * | 1/2008 | Hillis | G06F 3/017 382/154 |
| 2008/0014835 A1 | 1/2008 | Weston et al. | |
| 2008/0074652 A1 * | 3/2008 | Fouquet | G01C 21/02 356/218 |
| 2008/0096654 A1 | 4/2008 | Mondesir et al. | |
| 2008/0113800 A1 * | 5/2008 | Ciavaglia | A63H 17/004 463/39 |
| 2008/0125896 A1 * | 5/2008 | Troy | G05D 1/0033 700/110 |
| 2008/0158555 A1 * | 7/2008 | Mori | G01S 7/481 356/239.2 |
| 2008/0244468 A1 | 10/2008 | Nishihara et al. | |
| 2009/0051653 A1 | 2/2009 | Barney et al. | |
| 2009/0066784 A1 | 3/2009 | Stone et al. | |
| 2009/0115721 A1 | 5/2009 | Aull et al. | |
| 2009/0121894 A1 | 5/2009 | Wilson et al. | |

(56) References Cited

U.S. PATENT DOCUMENTS

| | | |
|---|---|---|
| 2009/0124165 A1 | 5/2009 | Weston |
| 2009/0191968 A1 | 7/2009 | Johnson et al. |
| 2009/0215534 A1 | 8/2009 | Wilson et al. |
| 2009/0222149 A1 | 9/2009 | Murray et al. |
| 2009/0233769 A1* | 9/2009 | Pryor .................... B60K 35/00 482/8 |
| 2009/0278915 A1 | 11/2009 | Kramer et al. |
| 2009/0298603 A1* | 12/2009 | Crawford ................ A63G 4/00 472/137 |
| 2009/0303069 A1* | 12/2009 | Carl, Jr. ............... G08B 13/191 340/686.1 |
| 2009/0316952 A1 | 12/2009 | Ferren et al. |
| 2010/0040292 A1 | 2/2010 | Clarkson |
| 2010/0050133 A1* | 2/2010 | Nishihara ............... G06F 3/017 715/863 |
| 2010/0133424 A1* | 6/2010 | Lindsay ............. A63B 69/3632 250/237 R |
| 2010/0134308 A1 | 6/2010 | Barnardo et al. |
| 2010/0292007 A1 | 7/2010 | Tarra et al. |
| 2010/0194762 A1 | 8/2010 | Latta et al. |
| 2010/0199228 A1 | 8/2010 | Latta et al. |
| 2010/0199230 A1 | 8/2010 | Latta et al. |
| 2010/0208129 A1 | 8/2010 | Rindfuss et al. |
| 2010/0215215 A1* | 8/2010 | Ueshima ................ A63F 13/06 382/103 |
| 2010/0281436 A1 | 11/2010 | Kipman et al. |
| 2010/0304868 A1 | 12/2010 | Zalewski |
| 2010/0306712 A1 | 12/2010 | Snook et al. |
| 2010/0306714 A1 | 12/2010 | Latta et al. |
| 2010/0306715 A1 | 12/2010 | Geisner et al. |
| 2010/0306716 A1 | 12/2010 | Perez |
| 2010/0321149 A1* | 12/2010 | Foster .................. A61B 5/1072 340/5.2 |
| 2011/0081970 A1 | 4/2011 | Barney et al. |
| 2011/0118021 A1 | 5/2011 | Zalewski |
| 2011/0151974 A1 | 6/2011 | Deaguero |
| 2011/0174189 A1 | 7/2011 | Beutler |
| 2011/0183751 A1* | 7/2011 | Ueshima ................ A63F 13/12 463/30 |
| 2011/0301757 A1* | 12/2011 | Jones .................... A01G 9/088 700/258 |
| 2012/0218107 A1* | 8/2012 | Mimeault ............... G01V 8/20 340/565 |
| 2012/0262366 A1 | 10/2012 | Zhu et al. |
| 2012/0280847 A1* | 11/2012 | Frucht ................ G08B 13/184 342/7 |
| 2012/0327241 A1* | 12/2012 | Howe ................ G06K 9/00771 348/155 |
| 2013/0177296 A1 | 7/2013 | Geisner et al. |
| 2013/0188839 A1 | 7/2013 | Abraham et al. |
| 2013/0300637 A1* | 11/2013 | Smits .................... G03B 35/18 345/8 |
| 2013/0320236 A1* | 12/2013 | Ohta ..................... G02B 5/12 250/458.1 |
| 2013/0342813 A1* | 12/2013 | Wang ................. G02B 27/2235 353/7 |
| 2014/0036076 A1 | 2/2014 | Nerayoff et al. |
| 2014/0166854 A1* | 6/2014 | Kowalevicz ............ F41G 3/14 250/208.1 |
| 2014/0240102 A1* | 8/2014 | Kawash ................ G06F 3/017 340/12.5 |
| 2014/0314278 A1 | 10/2014 | Tatsuzawa et al. |
| 2015/0336015 A1* | 11/2015 | Blum .................... A63G 33/00 472/137 |
| 2015/0338196 A1* | 11/2015 | Cortelyou ................ F42B 4/00 700/253 |
| 2015/0338548 A1* | 11/2015 | Cortelyou ............... G01V 8/14 250/206.1 |
| 2015/0339910 A1* | 11/2015 | Stenzler ................ G08B 21/22 340/573.4 |
| 2015/0339920 A1* | 11/2015 | Cortelyou ............... G08G 1/01 340/907 |
| 2016/0170105 A1* | 6/2016 | Nagaya .................... G02B 5/22 359/885 |
| 2017/0189818 A1* | 7/2017 | Stenzler ................... A63G 7/00 |

FOREIGN PATENT DOCUMENTS

| | | |
|---|---|---|
| GB | 2352899 A | 2/2001 |
| JP | 1997506194 | 6/1997 |
| JP | 1999211831 A | 6/1999 |
| JP | 2012120648 | 6/2012 |
| JP | 2012226666 A | 11/2012 |
| JP | 2013175221 A | 9/2013 |
| WO | 9515505 | 6/1995 |

OTHER PUBLICATIONS

Chung, J. et al.; "Vision Based Motion Tracking System for Interactive Entertainment Applications"; ETRI 2005, pp. 1-6.

Hargather, M. et al.; "Retroreflective Shadowgraph Technique for Large-Scale Flow Visualization"; Applied Optics vol. 48(22) 2009, pp. 4449-4457.

Sparacino, F. et al.; "Media in Performance: Interactive Spaces for Dance, Theater, Circus, and Museum Exhibits"; IBM Systems Journal vol. 39 (3&4) 2000, pp. 479-510.

Ouchi et al., "Magic Wand: An Intuitive Gesture Remote Control for Home Appliances," May 2005.

Retroreflection. Personal Safety Products; 3M Occupational health and Environmental Safety Division; 2005. www.3M.com/Scotchlite.

* cited by examiner

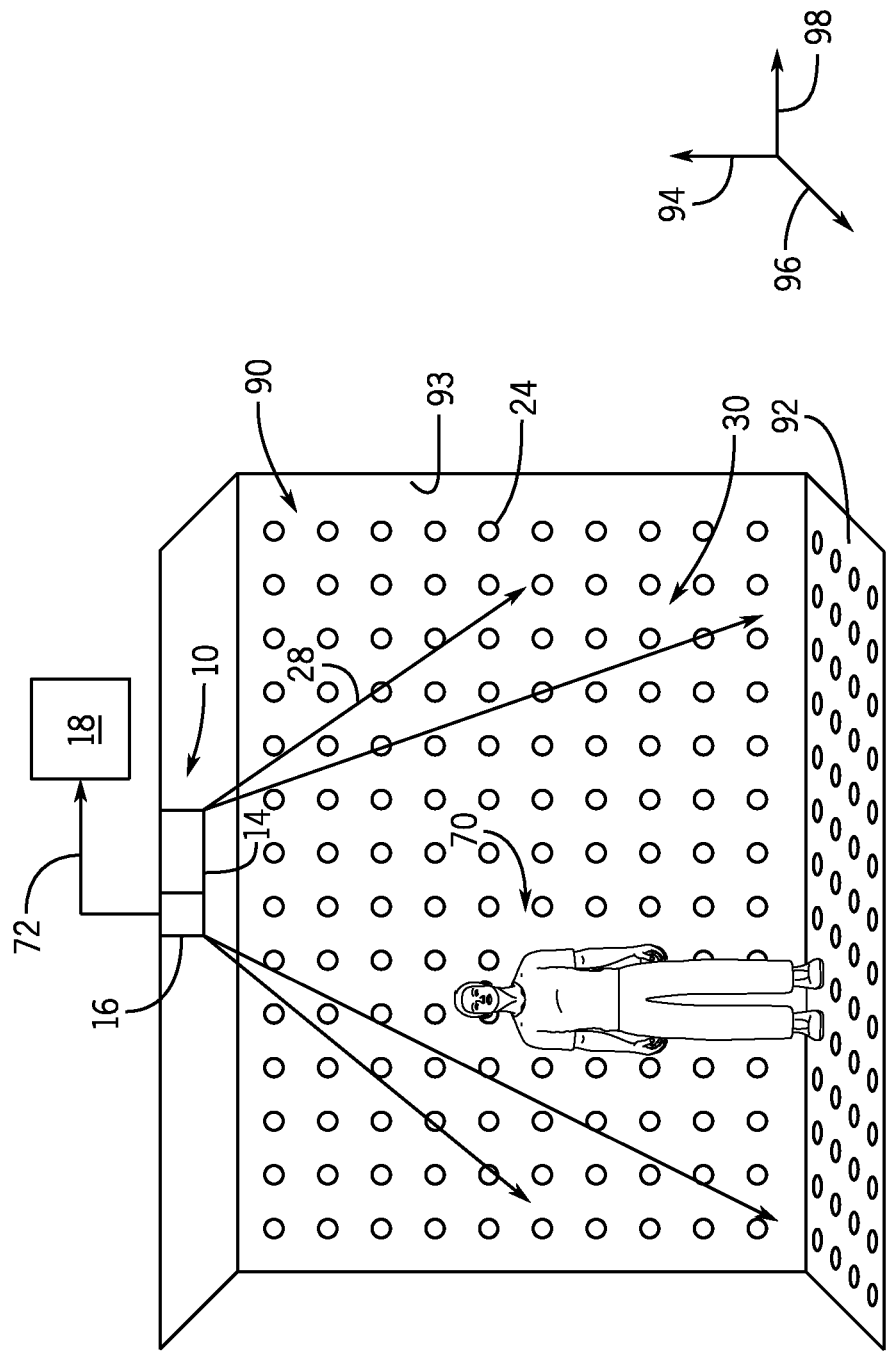

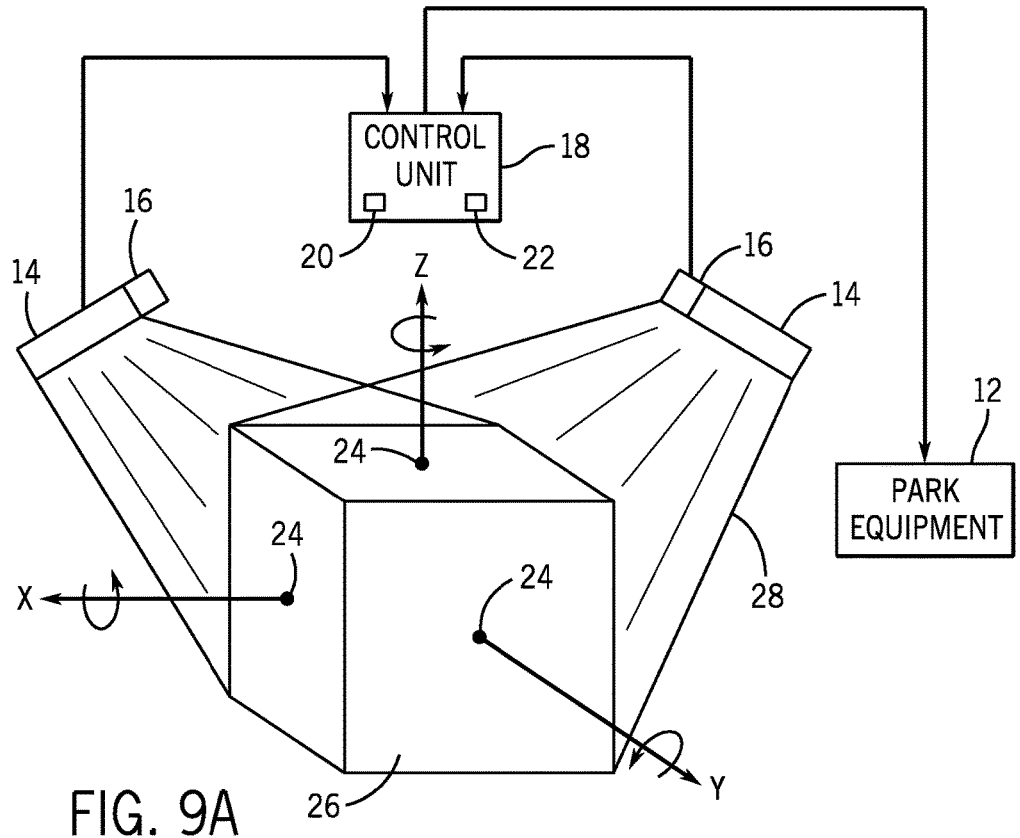
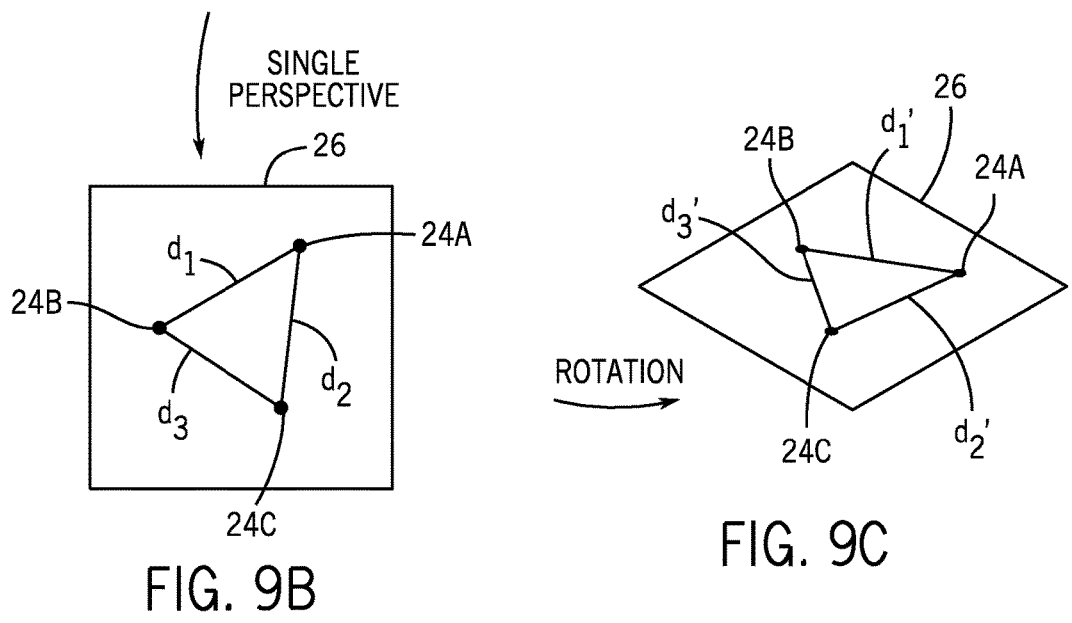
FIG. 9A
FIG. 9B
FIG. 9C

OPTICAL TRACKING SYSTEM FOR AUTOMATION OF AMUSEMENT PARK ELEMENTS

CROSS REFERENCE TO RELATED APPLICATIONS

This application claims the benefit of U.S. Provisional Application No. 62/001,551, filed May 21, 2014, which is incorporated herein by reference in its entirety for all purposes.

BACKGROUND

The present disclosure relates generally to the field of tracking systems and, more particularly, to methods and equipment used to enable tracking of elements in a variety of contexts through a dynamic signal to noise ratio tracking system.

Tracking systems have been widely used to track motion, position, orientation, and distance, among other aspects, of objects in a wide variety of contexts. Such existing tracking systems generally include an emitter that emits electromagnetic energy and a detector configured to detect the electromagnetic energy, sometimes after it has been reflected off an object. It is now recognized that traditional tracking systems have certain disadvantages and that improved tracking systems are desired for use in a variety of contexts, including amusement park attractions, workplace monitoring, sports, fireworks displays, factory floor management, robotics, security systems, parking, and transportation, among others.

BRIEF DESCRIPTION

In accordance with an embodiment of the present disclosure, an amusement park tracking and control system includes a plurality of retro-reflective markers positioned within a guest attraction area, an emission subsystem configured to emit electromagnetic radiation toward the plurality of retro-reflective markers, a detection subsystem configured to detect reflection from the plurality of retro-reflective markers resulting from electromagnetic radiation emission by the emission subsystem, and a control system communicatively coupled to the detection subsystem and having processing circuitry configured to monitor the reflection by the plurality of retro-reflective markers, evaluate information relating to a person in the guest attraction area based on changes in the monitored reflection, and to control automated equipment within the guest attraction area based on the evaluated information.

In accordance with another embodiment of the present disclosure, an amusement park tracking and control system includes a control system having processing circuitry configured to receive data indicative of electromagnetic radiation reflection from a plurality of retro-reflective markers and to monitor the electromagnetic reflection by the plurality of retro-reflective markers for a change from a first pattern of reflection by the plurality of retro-reflective markers to a second pattern of reflection by the plurality of retro-reflective markers. The processing circuitry of the control system is configured to evaluate information relating to a person in the guest attraction area based on changes in the monitored electromagnetic radiation reflection, and to generate an output to control automated equipment within the guest attraction area based on the evaluated information.

In accordance with a further embodiment of the present disclosure, a method of operating an amusement park attraction includes flooding a guest attraction area of the amusement park attraction with electromagnetic radiation using an emission subsystem having one or more emitters, detecting wavelengths of electromagnetic radiation retro-reflected from within the guest attraction area while filtering wavelengths of electromagnetic radiation not retro-reflected from within the guest attraction area using a detection subsystem having one or more optical filters, tracking changes in the reflected electromagnetic radiation to evaluate information relating to one or more persons in the guest attraction area with a control system communicatively coupled to the detection subsystem, and controlling automated equipment within the guest attraction area based on the evaluated information using the control system.

DRAWINGS

These and other features, aspects, and advantages of the present disclosure will become better understood when the following detailed description is read with reference to the accompanying drawings in which like characters represent like parts throughout the drawings, wherein:

FIG. 7 is an elevational view of a room with a grid pattern of retro-reflective markers disposed on a wall and a floor of the room for tracking a position of people and objects in the room via the tracking system of FIG. 1, in accordance with an embodiment of the present disclosure;

FIGS. 9A-9C depict the manner in which an object may be tracked in three spatial dimensions by the tracking system of FIG. 1, in accordance with an embodiment of the present disclosure;

Figure 1:
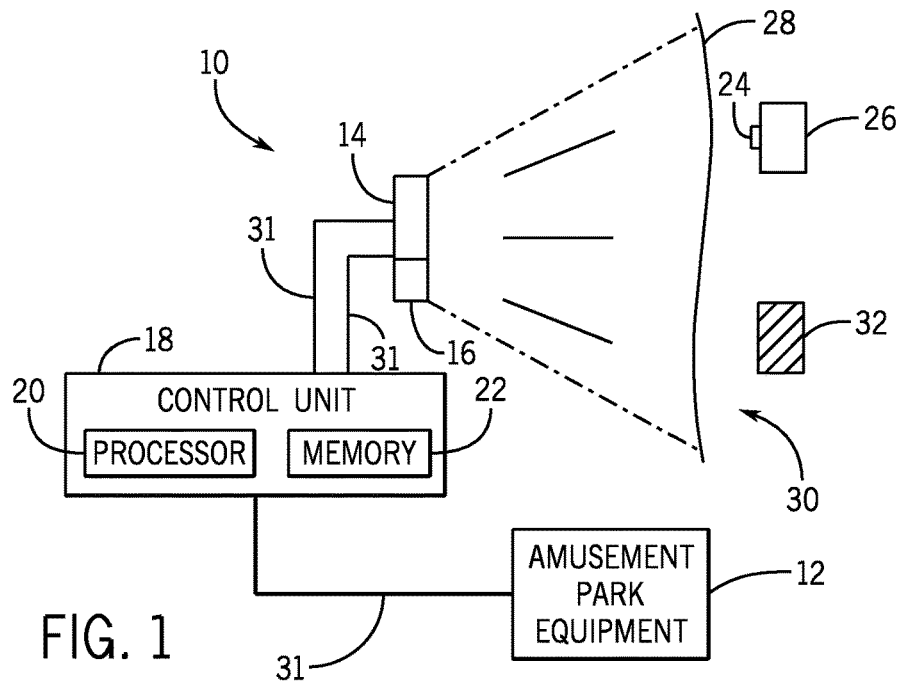
FIG. 1 is a schematic diagram of a tracking system utilizing a dynamic signal to noise ratio device to track objects, in accordance with an embodiment of the present disclosure.
Figure 26:
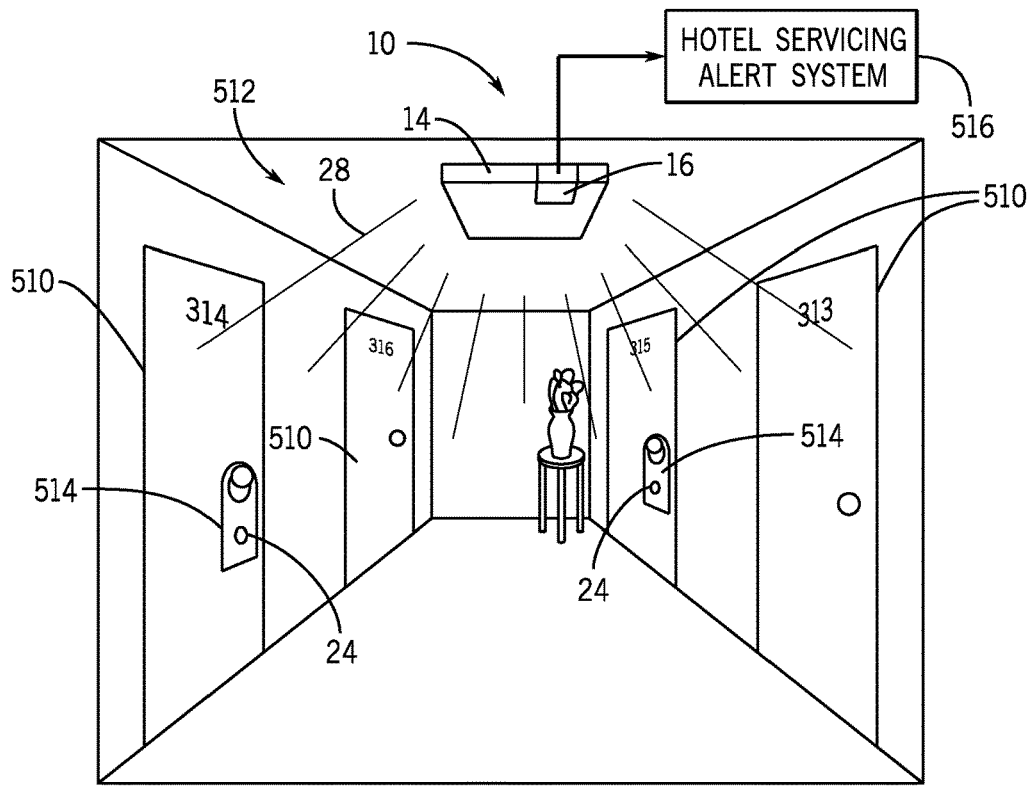
Figure 27:
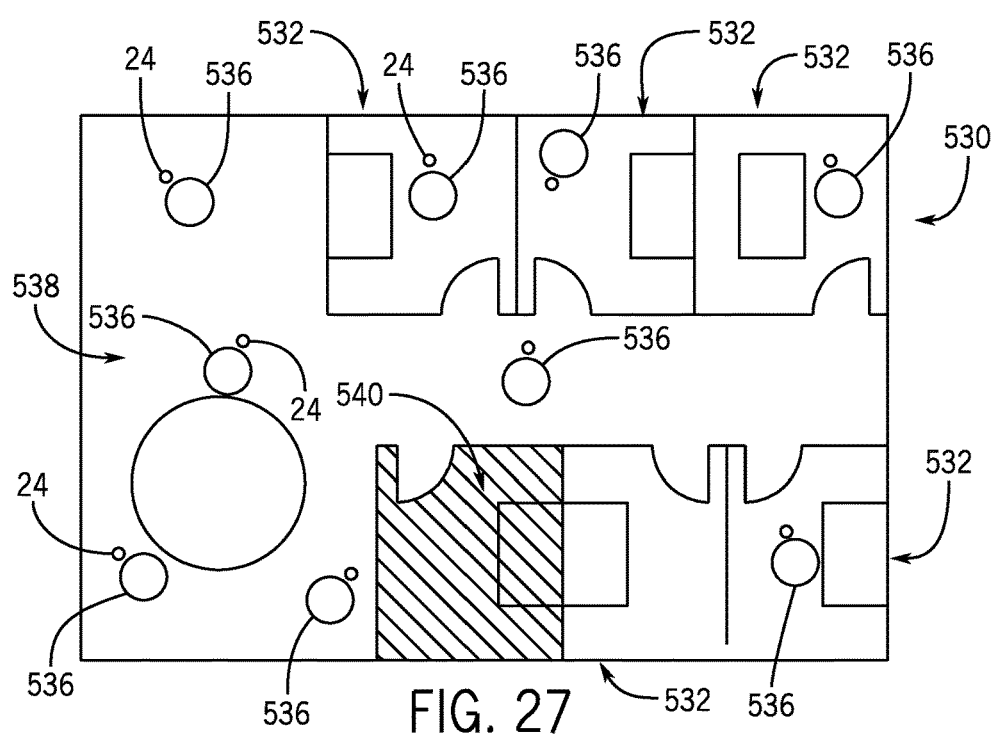

FIG. 26 is a perspective schematic view of a hallway equipped with the tracking system of FIG. 1 to detect markers on hangtags located in the hallway, in accordance with an embodiment of the present disclosure; and FIG. 27 is an overhead schematic view of a floor plan of an office building equipped with the tracking system of FIG. 1 to detect positions of workers in the office building, in accordance with an embodiment of the present disclosure.

DETAILED DESCRIPTION

Generally, tracking systems may use a wide variety of inputs obtained from a surrounding environment to track certain objects. The source of the inputs may depend, for instance, on the type of tracking being performed and the capabilities of the tracking system. For example, tracking systems may use sensors disposed in an environment to actively generate outputs received by a main controller. The controller may then process the generated outputs to determine certain information used for tracking. One example of such tracking may include tracking the motion of an object to which a sensor is fixed. Such a system might also utilize one or more devices used to bathe an area in electromagnetic radiation, a magnetic field, or the like, where the electromagnetic radiation or magnetic field is used as a reference against which the sensor's output is compared by the controller. As may be appreciated, such active systems, if implemented to track a large number of objects or even people, could be quite expensive to employ and processor-intensive for the main controller of the tracking system.

Other tracking systems, such as certain passive tracking systems, may perform tracking without providing an illumination source or the like. For instance, certain tracking systems may use one or more cameras to obtain outlines or rough skeletal estimates of objects, people, and so forth. However, in situations where background illumination may be intense, such as outside on a hot and sunny day, the accuracy of such a system may be reduced due to varying degrees of noise received by detectors of the passive tracking system.

With the foregoing in mind, it is now recognized that traditional tracking systems have certain disadvantages and that improved tracking systems are desired for use in a variety of contexts, including amusement park attractions, workplace monitoring, sports, and security systems, among others. For instance, it is presently recognized that improved tracking systems may be utilized to enhance operations in a variety of amusement park settings and other entertainment attractions.

In accordance with one aspect of the present disclosure, a dynamic signal to noise ratio tracking system uses emitted electromagnetic radiation and, in some embodiments, retro-reflection, to enable detection of markers and/or objects within the field of view of the tracking system. The disclosed tracking system may include an emitter configured to emit electromagnetic radiation in a field of view, a sensing device configured to detect the electromagnetic radiation retro-reflected back from objects within the field of view, and a controller configured to perform various processing and analysis routines including interpreting signals from the sensing device and controlling automated equipment based on the detected locations of the objects or markers. The disclosed tracking system may also be configured to track several different objects at the same time (using the same emission and detection features). In some embodiments, the tracking system tracks a location of retro-reflective markers placed on the objects to estimate a location of the objects. As used herein, retro-reflective markers are reflective markers designed to retro-reflect electromagnetic radiation approximately back in the direction from which the electromagnetic radiation was emitted. More specifically, retro-reflective markers used in accordance with the present disclosure, when illuminated, reflect electromagnetic radiation back toward the source of emission in a narrow cone. In contrast, certain other reflective materials, such as shiny materials, may undergo diffuse reflection where electromagnetic radiation is reflected in many directions. Further still, mirrors, which also reflect electromagnetic radiation, do not typically undergo retro-reflection. Rather, mirrors undergo specular reflection, where an angle of electromagnetic radiation (e.g., light such as infrared, ultraviolet, visible, or radio waves and so forth) incident onto the mirror is reflected at an equal but opposite angle (away from the emission source).

Retro-reflective materials used in accordance with the embodiments set forth below can be readily obtained from a number of commercial sources. One example includes retro-reflective tape, which may be fitted to a number of different objects (e.g., environmental features, clothing items, toys). Due to the manner in which retro-reflection occurs using such markers in combination with the detectors used in accordance with the present disclosure, the retro-reflective markers cannot be washed out by the sun or even in the presence of other emitters that emit electromagnetic radiation in wavelengths that overlap with the wavelengths of interest. Accordingly, the disclosed tracking system may be more reliable, especially in an outdoor setting and in the presence of other electromagnetic emission sources, compared to existing optical tracking systems.

While the present disclosure is applicable to a number of different contexts, presently disclosed embodiments are directed to, among other things, various aspects relating to controlling amusement park equipment (e.g., automated equipment) based on information obtained from such a dynamic signal to noise ratio tracking system. Indeed, it is presently recognized that by using the disclosed tracking systems, reliable and efficient amusement park operations may be carried out, even though there are a number of moving objects, guests, employees, sounds, lights, and so forth, in an amusement park, which could otherwise create high levels of noise for other tracking systems.

In certain aspects of the present disclosure, a control system of the amusement park (e.g., a control system associated with a particular area of the amusement park, such as a ride) may use information obtained by the dynamic signal to noise ratio tracking system to monitor and evaluate information relating to people (e.g., guests, amusement park employees) in the area to determine whether certain automated processes may be triggered or otherwise allowed to proceed. The evaluated information pertaining to people in the amusement park may include, for instance, a location, a movement, a size, or other information relating to one or more persons in a guest attraction area. By way of non-limiting example, the information may be evaluated to determine whether people (e.g., guests, a ride operator) are clear of a loading area of a ride vehicle, to determine whether guests in a line are of a size appropriate for a particular ride (e.g., meet a height requirement), to determine whether a guest has entered a controlled access zone, and so forth.

As a result of performing such evaluations, the control system may generate control signals or some other output that cause certain automated equipment in the guest attraction area (or other area of the amusement park) to perform specific functions. The functions performed by the automated equipment may include, for instance, automatically dispatching a ride vehicle, automatically providing or denying access to certain amusement park areas, triggering of show effects (e.g., flames), synchronization of security cameras with controlled access zone breach detection, control of machine movement (e.g., control of the displacement of a ride vehicle), and similar actions.

Certain aspects of the present disclosure may be better understood with reference to FIG. 1, which generally illustrates the manner in which a dynamic signal to noise ratio tracking system 10 (hereinafter referred to as "tracking system 10") may be integrated with amusement park equipment 12 in accordance with present embodiments. As illustrated, the tracking system 10 includes an emitter 14 (which may be all or a part of an emission subsystem having one or more emission devices and associated control circuitry) configured to emit one or more wavelengths of electromagnetic radiation (e.g., light such as infrared, ultraviolet, visible, or radio waves and so forth) in a general direction. The tracking system 10 also includes a detector 16 (which may be all or a part of a detection subsystem having one or more sensors, cameras, or the like, and associated control circuitry) configured to detect electromagnetic radiation reflected as a result of the emission, as described in further detail below.

To control operations of the emitter 14 and detector 16 (emission subsystem and detection subsystem) and perform various signal processing routines resulting from the emission, reflection, and detection process, the tracking system 10 also includes a control unit 18 communicatively coupled to the emitter 14 and detector 16. Accordingly, the control unit 18 may include one or more processors 20 and one or more memory 22, which may generally referred to herein as "processing circuitry." By way of specific but non-limiting example, the one or more processors 20 may include one or more application specific integrated circuits (ASICs), one or more field programmable gate arrays (FPGAs), one or more general purpose processors, or any combination thereof. Additionally, the one or more memory 22 may include volatile memory, such as random access memory (RAM), and/or non-volatile memory, such as read-only memory (ROM), optical drives, hard disc drives, or solid-state drives. In some embodiments, the control unit 18 may form at least a portion of a control system configured to coordinate operations of various amusement park features, including the equipment 12. As described below, such an integrated system may be referred to as an amusement park attraction and control system.

The tracking system 10 is specifically configured to detect a position of an illuminated component, such as a retro-reflective marker 24 having a properly correlated retro-reflective material relative to a grid, pattern, the emission source, stationary or moving environmental elements, or the like. In some embodiments, the tracking system 10 is designed to utilize the relative positioning to identify whether a correlation exists between one or more such illuminated components and a particular action to be performed by the amusement park equipment 12, such as triggering of a show effect, dispatch of a ride vehicle, closure of a gate, synchronization of security cameras with movement, and so on. More generally, the action may include the control of machine movement, image formation or adaptation, and similar processes.

As illustrated, the retro-reflective marker 24 is positioned on an object 26, which may correspond to any number of static or dynamic features. For instance, the object 26 may represent boundary features of an amusement park attraction, such as a floor, a wall, a gate, or the like, or may represent an item wearable by a guest, park employee, or similar object. Indeed, as set forth below, within an amusement park attraction area, many such retro-reflective markers 24 may be present, and the tracking system 10 may detect reflection from some or all of the markers 24, and may perform various analyses based on this detection.

Referring now to the operation of the tracking system 10, the emitter 14 operates to emit electromagnetic radiation, which is represented by an expanding electromagnetic radiation beam 28 for illustrative purposes, to selectively illuminate, bathe, or flood a detection area 30 in the electromagnetic radiation. Electromagnetic radiation beam 28 is intended to generally represent any form of electromagnetic radiation that may be used in accordance with present embodiments, such as forms of light (e.g., infrared, visible, UV) and/or other bands of the electromagnetic spectrum (e.g., radio waves and so forth). However, it is also presently recognized that, in certain embodiments, it may be desirable to use certain bands of the electromagnetic spectrum depending on various factors. For example, in one embodiment, it may be desirable to use forms of electromagnetic radiation that are not visible to the human eye or within an audible range of human hearing, so that the electromagnetic radiation used for tracking does not distract guests from their experience. Further, it is also presently recognized that certain forms of electromagnetic radiation, such as certain wavelengths of light (e.g., infrared) may be more desirable than others, depending on the particular setting (e.g., whether the setting is "dark," or whether people are expected to cross the path of the beam). Again, the detection area 30 may correspond to all or a part of an amusement park attraction area, such as a stage show, a ride vehicle loading area, a waiting area outside of an entrance to a ride or show, and so forth.

The electromagnetic radiation beam 28, in certain embodiments, may be representative of multiple light beams (beams of electromagnetic radiation) being emitted from different sources (all part of an emission subsystem). Further, in some embodiments the emitter 14 is configured to emit the electromagnetic radiation beam 28 at a frequency that has a correspondence to a material of the retro-reflective marker 24 (e.g., is able to be reflected by the retro-reflective elements of the marker 24). For instance, the retro-reflective marker 24 may include a coating of retro-reflective material disposed on a body of the object 26 or a solid piece of material coupled with the body of the object 26. By way of more specific but non-limiting example, the retro-reflective material may include spherical and/or prismatic reflective elements that are incorporated into a reflective material to enable retro-reflection to occur. Again, in certain embodiments many such retro-reflective markers 24 may be present, and may be arranged in a particular pattern stored in the memory 22 to enable further processing, analysis, and control routines to be performed by the control unit 18 (e.g., control system).

The retro-reflective marker 24 may reflect a majority of the electromagnetic radiation (e.g., infrared, ultraviolet, visible wavelengths, or radio waves and so forth) incident from the electromagnetic radiation beam 28 back toward the detector 16 within a relatively well-defined cone having a central axis with substantially the same angle as the angle of incidence. This reflection facilitates identification of a location of the retro-reflective marker 24 by the system 10 and correlation thereof to various information stored in the memory 22 (e.g., patterns, possible locations). This location information (obtained based on the reflected electromagnetic radiation) may then be utilized by the control unit 18 to perform various analysis routines and/or control routines, for example to determine whether to cause triggering or other control of the amusement park equipment 12.

Specifically, in operation, the detector 16 of the system 10 may function to detect the electromagnetic radiation beam 28 retro-reflected from the retro-reflective marker 24 and provide data associated with the detection to the control unit 18 via communication lines 31 for processing. The detector 16 may operate to specifically identify the marker 24 based on certain specified wavelengths of electromagnetic radiation emitted and reflected and, thus, avoid issues with false detections. For example, the detector 16 may be specifically configured to detect certain wavelengths of electromagnetic radiation (e.g., corresponding to those emitted by the emitter 14) through the use of physical electromagnetic radiation filters, signal filters, and the like. Further, the detector 16 may utilize a specific arrangement of optical detection features and electromagnetic radiation filters to capture substantially only retro-reflected electromagnetic radiation.

For example, the detector 16 may be configured to detect wavelengths of electromagnetic radiation retro-reflected by the retro-reflective markers 24 while filtering wavelengths of electromagnetic radiation not retro-reflected by the markers 24, including those wavelengths of interest. Thus, the detector 16 may be configured to specifically detect (e.g., capture) retro-reflected electromagnetic radiation while not detecting (e.g., capturing) electromagnetic radiation that is not retro-reflected. In one embodiment, the detector 16 may utilize the directionality associated with retro-reflection to perform this selective filtering. Accordingly, while the detector 16 receives electromagnetic radiation from a variety of sources (including spuriously reflected electromagnetic radiation, as well as environmental electromagnetic radiation), the detector 16 is specifically configured to filter out all or substantially all spuriously reflected signals while retaining all or substantially all intended signals. Thus, the signal-to-noise ratio of signals actually processed by the detector 16 and control unit 18 is very high, regardless of the signal-to-noise ratio that exists for the electromagnetic bands of interest outside of the detector 16.

For example, the detector 16 may receive retro-reflected electromagnetic radiation (e.g., from the retro-reflective markers 24) and ambient electromagnetic radiation from within an area (e.g., guest attraction area). The ambient electromagnetic radiation may be filtered, while the retro-reflected electromagnetic radiation, which is directional, may not be filtered (e.g., may bypass the filter). Thus, in certain embodiments, the "image" generated by the detector 16 may include a substantially dark (e.g., black or blank) background signal, with substantially only retro-reflected electromagnetic radiation producing contrast.

In accordance with certain embodiments, the retro-reflected electromagnetic radiation may include different wavelengths that are distinguishable from one another. In one embodiment, the filters of the detector 16 may have optical qualities and may be positioned within the detector such that the optical detection devices of the detector 16 substantially only receive electromagnetic wavelengths retro-reflected by the retro-reflective markers 24 (or other retro-reflective elements), as well as any desired background wavelengths (which may provide background or other landscape information). To produce signals from the received electromagnetic radiation, as an example, the detector 16 may be a camera having a plurality of electromagnetic radiation capturing features (e.g., charge-coupled devices (CCDs) and/or complementary metal oxide semiconductor (CMOS) sensors corresponding to pixels). In one example embodiment, the detector 16 may be an Amp® high dynamic range (HDR) camera system available from Contrast Optical Design and Engineering, Inc. of Albuquerque, N. Mex.

Because retro-reflection by the retro-reflective markers 24 is such that a cone of reflected electromagnetic radiation is incident on the detector 16, the control unit 18 may in turn correlate a center of the cone, where the reflected electromagnetic radiation is most intense, to a point source of the reflection. Based on this correlation, the control unit 18 may identify and track a location of this point source, or may identify and monitor a pattern of reflection by many such retro-reflective markers 24.

For instance, once the control unit 18 receives the data from the detector 16, the control unit 18 may employ known visual boundaries or an established orientation of the detector 16 to identify a location (e.g., coordinates) corresponding to the detected retro-reflective marker 24. When multiple stationary retro-reflective markers 24 are present, the control unit 18 may store known positions (e.g., locations) of the retro-reflective markers 24 to enable reflection pattern monitoring. By monitoring a reflection pattern, the control unit 18 may identify blockage (occlusion) of certain retro-reflective markers 24 by various moving objects, guests, employees, and so forth. It should also be noted that the bases for these comparisons may be updated based on, for example, how long a particular retro-reflective marker 24 has been positioned and used in its location. For instance, the stored pattern of reflection associated with one of the markers 24 may be updated periodically during a calibration stage, which includes a time period during which no objects or people are expected to pass over the marker 24. Such re-calibrations may be performed periodically so that a marker that has been employed for an extended period of time and has lost its retro-reflecting capability is not mistaken for a detected occlusion event.

In other embodiments, in addition to or in lieu of tracking one or more of the retro-reflective markers 24, the tracking system 10 may be configured to detect and track various other objects located within the detection area 30. Such objects 32 may include, among other things, ride vehicles, people (e.g., guests, employees), and other moving park equipment. For example, the detector 16 of the system 10 may function to detect the electromagnetic radiation beam 28 bouncing off of an object 32 (without retro-reflective markers 24) and provide data associated with this detection to the control unit 18. That is, the detector 16 may detect the object 32 based entirely on diffuse or specular reflection of electromagnetic energy off the object 32. In some embodiments, the object 32 may be coated with a particular coating that reflects the electromagnetic radiation beam 28 in a detectable and predetermined manner. Accordingly, once the control unit 18 receives the data from the detector 16, the control unit 18 may determine that the coating associated with the object 32 reflected the electromagnetic radiation, and may also determine the source of the reflection to identify a location of the object 32.

Whether the retro-reflective markers 24 are stationary or moving, the process of emitting the electromagnetic radiation beam 28, sensing of the reflected electromagnetic radiation from the retro-reflective markers 24 (or objects 32 with no or essentially no retro-reflective material), and determining a location of the retro-reflective marker 24 or object 32 may be performed by the control unit 18 numerous times over a short period. This process may be performed at distinct intervals, where the process is initiated at predetermined time points, or may be performed substantially continuously, such that substantially immediately after the process is completed, it is re-initiated. In embodiments where the retro-reflective markers 24 are stationary and the control unit 18 performs retro-reflective pattern monitoring to identify marker blockage, the process may be performed at intervals to obtain a single retro-reflective pattern at each interval. This may be considered to represent a single frame having a reflection pattern corresponding to a pattern of blocked and unblocked retro-reflective markers 24.

On the other hand, such procedures may essentially be performed continuously to facilitate identification of a path and/or trajectory through which the retro-reflective marker 24 has moved. The marker 24, moving within the detection area 30, would be detected over a particular timeframe or simply in continuous series. Here, the pattern of reflection would be generated and identified over a time period.

In accordance with the embodiments set forth above, the detector 16 and control unit 18 may operate on a variety of different timeframes depending on the tracking to be performed and the expected movement of the tracked object through space and time. As an example, the detector 16 and the control unit 18 may operate in conjunction to complete all logical processes (e.g., updating analysis and control signals, processing signals) in the time interval between the capture events of the detector 16. Such processing speeds may enable substantially real-time tracking, monitoring, and control where applicable. By way of non-limiting example, the detector capture events may be between approximately $\frac{1}{60}$ of a second and approximately $\frac{1}{30}$ of a second, thus generating between 30 and 60 frames per second. The detector 16 and the control unit 18 may operate to receive, update, and process signals between the capture of each frame. However, any interval between capture events may be utilized in accordance with certain embodiments.

Once a particular pattern of retro-reflection has been detected, a determination may be made by the control unit 18 as to whether the pattern correlates to a stored pattern identified by the control unit 18 and corresponding to a particular action to be performed by the amusement park equipment 12. For example, the control unit 18 may perform a comparison of a position, path, or trajectory of the retro-reflective marker 24 with stored positions, paths, or trajectories to determine an appropriate control action for the equipment 12. Additionally or alternatively, as described in further detail below, the control unit 18 may determine whether a particular pattern obtained at a particular time point correlates to a stored pattern associated with a particular action to be performed by the amusement park equipment 12. Further still, the control unit 18 may determine whether a set of particular patterns obtained at particular time points correlate to a stored pattern change associated with a particular action to be performed by the amusement park equipment 12.

While the control unit 18 may cause certain actions to be automatically performed within the amusement park in the manner set forth above, it should be noted that similar analyses to those mentioned above may also be applied to the prevention of certain actions (e.g., where the park equipment 12 blocks action or is blocked from performing an action). For example, in situations where a ride vehicle can be automatically dispatched, the control unit 18, based upon tracking changes in the retro-reflective markers 24, may halt automatic dispatching, or may even prevent dispatching by a ride operator until additional measures are taken (e.g., additional confirmations that the ride vehicle is cleared for departure). This type of control may be applied to other amusement park equipment, as well. For example, flame effects, fireworks, or similar show effects may be blocked from being triggered, may be stopped, or may be reduced in intensity, due to intervention by the control unit 18 as a result of certain pattern determinations as described herein.

Having generally described the configuration of the system 10, it should be noted that the arrangement of the emitter 14, detector 16, control unit 18, and other features may vary based on application-specific considerations and the manner in which the control unit 18 performs evaluations based on electromagnetic radiation from the retro-reflective markers 24. In the embodiment of the tracking system 10 illustrated in FIG. 1, the emitter 14 and the sensor or detector 16 are integral features such that a plane of operation associated with the detector 16 is essentially overlapping with a plane of operation associated with the emitter 14. That is, the detector 16 is located in substantially the same position as the emitter 14, which may be desirable due to the retro-reflectivity of the markers 24. However, the present disclosure is not necessarily limited to this configuration. For instance, as noted above, retro-reflection may be associated with a cone of reflection, where the highest intensity is in the middle of the reflected cone. Accordingly, the detector 16 may be positioned within an area where the reflected cone of the retro-reflective markers is less intense than its center, but may still be detected by the detector 16.

Figure 2:
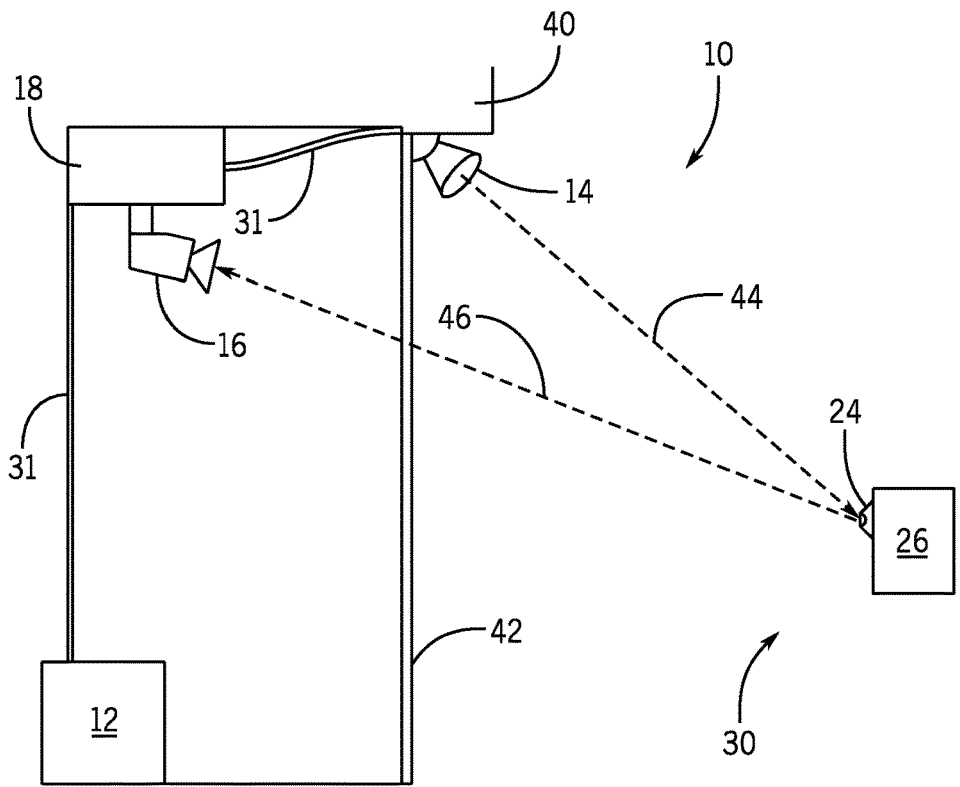
FIG. 2 is a schematic diagram of another tracking system utilizing a dynamic signal to noise ratio device to track objects, in accordance with an embodiment of the present disclosure.

By way of non-limiting example, in some embodiments, the emitter 14 and the detector 16 may be concentric. However, the detector 16 (e.g., an infrared camera) may be positioned in a different location with respect to the emitter 14, which may include an infrared light bulb, one or more diode emitters, or similar source. As illustrated in FIG. 2, the emitter 14 and detector 16 are separate and are positioned at different locations on an environmental feature 40 of an amusement attraction area (e.g., a wall or ceiling). Specifically, the emitter 14 of FIG. 2 is positioned outside of a window 42 of a storefront containing other components of the system 10. The detector 16 of FIG. 2 is positioned away from the emitter 14, but is still oriented to detect electromagnetic radiation reflected from the retro-reflective marker 24 and originating from the emitter 14.

For illustrative purposes, arrows 44, 46 represent a light beam (a beam of electromagnetic radiation) being emitted from the emitter 14 (arrow 44) into the detection area 30, retro-reflected by the retro-reflective marker 24 on the object 26 (arrow 46), and detected by the detector 16. The light beam represented by the arrow 44 is merely one of numerous electromagnetic radiation emissions (light beams) that flood or otherwise selectively illuminate the detection area 30 from the emitter 14. It should be noted that still other embodiments may utilize different arrangements of components of the system 10 and implementations in different environments in accordance with the present disclosure.

Having now discussed the general operation of the tracking system 10 to detect a position of retro-reflective markers 24 and/or objects 32, as illustrated in FIG. 1, certain applications of the tracking system 10 will be described in further detail below. For example, it may be desirable to track the locations of people within a particular area through the use of the disclosed tracking systems. This may be useful, for example, for controlling lines in a ride vehicle loading area, controlling access to different areas, determining appropriate instances when show effects can be triggered, determining appropriate instances when certain automated machinery can be moved, and may also be useful for assisting a live show performance (e.g., blocking actors on a stage). That is, during performances, actors are supposed to be standing at particular positions on the stage at certain times. To ensure that the actors are hitting their appropriate positions at the right time, the tracking system 10 may be installed above the stage and used to track the positions and/or motion of all the actors on the stage. Feedback from the tracking system 10 may be utilized to evaluate how well the actors are hitting the desired spots on the stage.

In addition to blocking on a stage, the tracking system 10 may be used in contexts that involve tracking and/or evaluating shoppers in a store or other commercial setting. That is, a store may be outfitted with the disclosed tracking systems 10 in order to determine where guests are spending time within the store. Instead of triggering a show effect, such tracking systems 10 may be used to monitor the flow of people within the store and control the availability of certain items as a result, control the flow of movement of people, etc. For instance, information collected via the disclosed tracking systems 10 may be used to identify and evaluate which setups or displays within the store are most attractive, to determine what items for sale are the most popular, or to determine which areas of the store, if any, are too crowded. This information may be analyzed and used to improve the store layout, product development, and crowd management, among other things.

It should be noted that other applications may exist for tracking positions of people, objects, machines, etc. within an area other than those described above. Presently disclosed tracking systems 10 may be configured to identify and/or track the position and movement of people and/or objects within the detection area 30. The tracking system 10 may accomplish this tracking in several different ways, which were introduced above and are explained in further detail below. It should be noted that the tracking system 10 is configured to detect a position of one or more people, one or more objects 32, or a combination of different features, at the same time in the same detection area 30 using the single emitter 14, detector 16, and control unit 18. However, the use of multiple such emitters 14, detectors 16, and control units 18 is also within the scope of the present disclosure. Accordingly, there may be one or more of the emitters 14 and one or more of the detectors 16 in the detection area 30. Considerations such as the type of tracking to be performed, the desired range of tracking, for redundancy, and so forth, may at least partially determine whether multiple or a single emitter and/or detector are utilized.

For instance, as noted above, the tracking system 10 may generally be configured to track a target moving in space and in time (e.g., within the detection area 30 over time). When a single detection device (e.g., detector 16) is utilized, the tracking system 10 may monitor retro-reflected electromagnetic radiation from a defined orientation to track a person, object, etc. Because the detector 16 has only one perspective, such detection and tracking may, in some embodiments, be limited to performing tracking in only one plane of movement (e.g., the tracking is in two spatial dimensions). Such tracking may be utilized, as an example, in situations where the tracked target has a relatively low number of degrees of freedom, such as when movement is restricted to a constrained path (e.g., a track). In one such embodiment, the target has a determined vector orientation.

On the other hand, when multiple detection devices are utilized (e.g., two or more of the detectors 16) to track a target in both space and time, the tracking system 10 may monitor retro-reflected electromagnetic radiation from multiple orientations. Using these multiple vantage points, the tracking system 10 may be able to track targets having multiple degrees of freedom. In other words, the use of multiple detectors may provide both vector orientation and range for the tracked target. This type of tracking may be particularly useful in situations where it may be desirable to allow the tracked target to have unrestricted movement in space and time.

Multiple detectors may also be desirable for redundancy in the tracking. For example, multiple detection devices applied to scenarios where movement of the target is restricted, or not, may enhance the reliability of the tracking performed by the tracking system 10. The use of redundant detectors 16 may also enhance tracking accuracy, and may help prevent geometric occlusion of the target by complex geometric surfaces, such as winding pathways, hills, folded clothing, opening doors, and so on.

Figure 3:
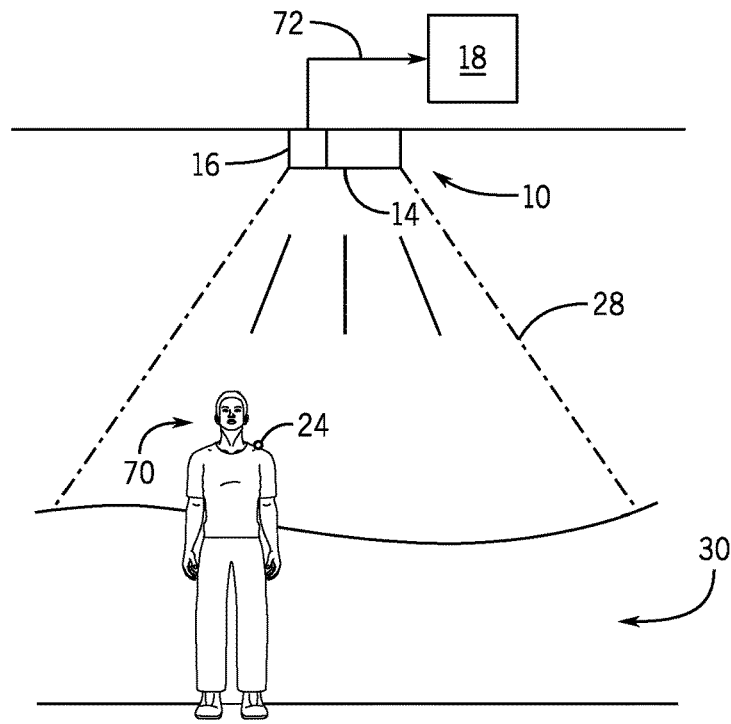
FIG. 3 is a schematic view of the tracking system of FIG. 1 tracking a retro-reflective marker on a person, in accordance with an embodiment of the present disclosure.

In accordance with one aspect of the present disclosure, the tracking system 10 may track relative positions of multiple targets (e.g., people, objects, machines) positioned within the detection area 30 through the use of the retro-reflective markers 24. As illustrated in FIG. 3, the retro-reflective markers 24 may be disposed on a person 70. Additionally or alternatively, the marker 24 may be positioned on a machine or other object (e.g., object 26). Accordingly, the techniques disclosed herein for tracking movement of the person 70 in space and time may also be applied to movement of an object in the amusement park, either in addition to the person 70 or as an alternative to the person 70. In such embodiments, the marker 24 may be positioned on an outside of the object 26 (e.g., a housing), as shown in FIG. 1.

In the illustrated embodiment of FIG. 3, the retro-reflective marker 24 is disposed on the outside of the person's clothing. For instance, the retro-reflective marker 24 may be applied as a strip of retro-reflective tape applied to an armband, headband, shirt, personal identification feature, or other article. Additionally or alternatively, the retro-reflective marker 24 may, in some embodiments, be sewn into clothing or applied to the clothing as a coating. The retro-reflective marker 24 may be disposed on the clothing of the person 70 in a position that is accessible to the electromagnetic radiation beam 28 being emitted from the emitter 14. As the person 70 walks about the detection area 30 (in the case of the object 32, the object 32 may move through the area 30), the electromagnetic radiation beam 28 reflects off the retro-reflective marker 24 and back to the detector 16. The detector 16 communicates with the control unit 18 by sending a signal 72 to the processor 20, this signal 72 being indicative of the reflected electromagnetic radiation detected via the detector 16. The tracking system 10 may interpret this signal 72 to track the position or path of the person 70 (or object 32) moving about a designated area (i.e., track the person or object in space and time). Again, depending on the number of detectors 16 utilized, the control unit 18 may determine vector magnitude, orientation, and sense of the person and/or object's movement based on the retro-reflected electromagnetic radiation received.

Figure 4:
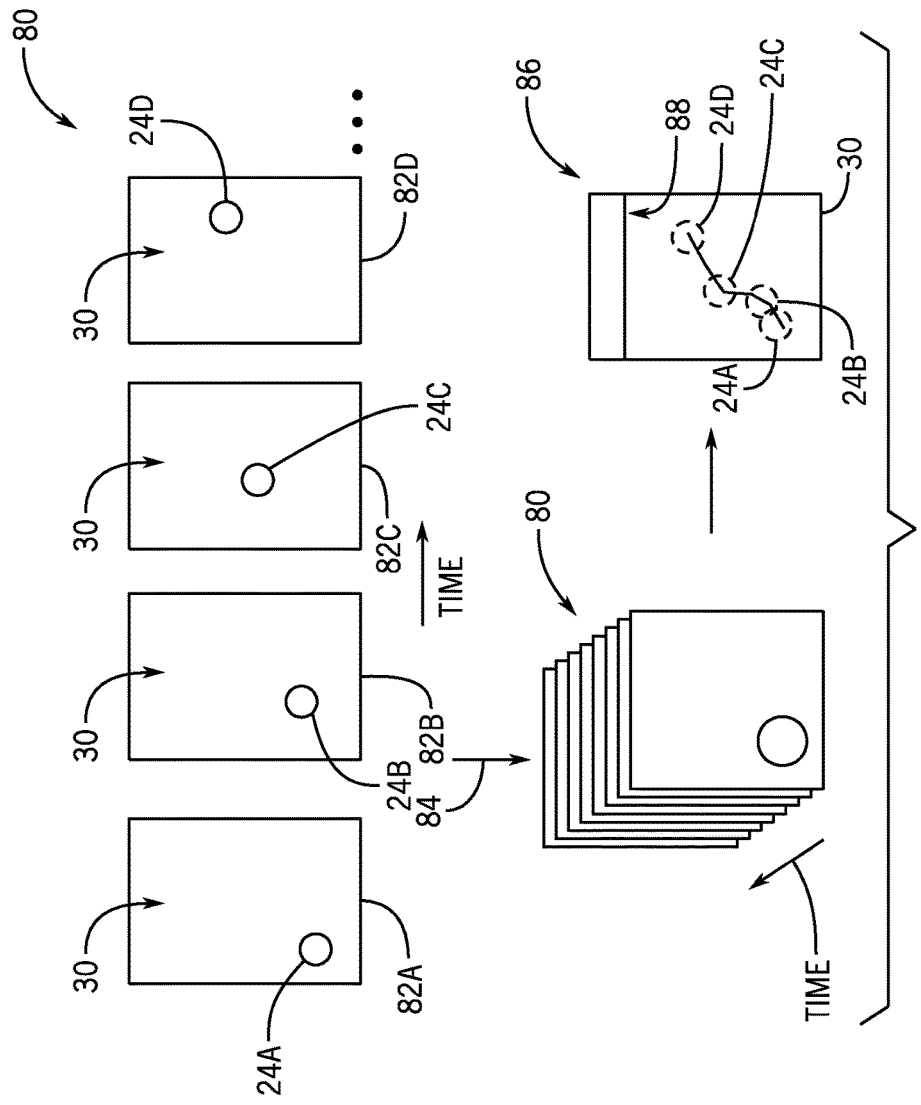
FIG. 4 is a schematic representation of an analysis performed by the tracking system of FIG. 1 in which position and movement of a person or object is tracked in space and time, in accordance with an embodiment of the present disclosure.

The tracking of the person 70 (which may also be representative of a moving object) is illustrated schematically in FIG. 4. More specifically, FIG. 4 illustrates a series 80 of frames 82 captured by the detector 16 (e.g., camera) over a period of time. As noted above, a plurality of such frames (e.g., between 30 and 60) may be generated every second in certain embodiments. It should be noted that FIG. 4 may not be an actual representation of outputs produced by the tracking system 10, but is described herein to facilitate an understanding of the tracking and monitoring performed by the control unit 18. The frames 82 each represent the detection area 30, and the position of the retro-reflective marker 24 within the area 30. Alternatively, the frames 82 may instead represent marker blockage within the area 30, for example where a grid of markers 24 are occluded by an object or person.

As shown, a first frame 82A includes a first instance of the retro-reflective marker, designated as 24A, having a first position. As the series 80 progresses in time, a second frame 82B includes a second instance of the retro-reflective marker 24B, which is displaced relative to the first instance, and so on (thereby producing third and fourth instances of the retro-reflective marker 24C and 24D). After a certain period of time, the control unit 18 has generated the series 80, where the operation of generating the series 80 is generally represented by arrow 84.

The series 80 may be evaluated by the control unit 18 in a number of different ways. In accordance with the illustrated embodiment, the control unit 18 may evaluate movement of the person 70 or object 32 by evaluating the positions of the marker 24 (or blockage of certain markers) over time. For example, the control unit 18 may obtain vector orientation, range, and sense, relating to the movement of the tracked target depending on the number of detectors 16 utilized to perform the tracking. In this way, the control unit 18 may be considered to evaluate a composite frame 86 representative of the movement of the tracked retro-reflective marker 24 (or tracked blockage of markers 24) over time within the detection area 30. Thus, the composite frame 86 includes the various instances of the retro-reflective marker 24 (including 24A, 24B, 24C, 24D), which may be analyzed to determine the overall movement of the marker 24 (and, therefore, the person 70 and/or object 26, whichever the case may be).

As also illustrated in FIG. 4, this monitoring may be performed relative to certain environmental elements 88, which may be fixed within the detection area 30 and/or may be associated with reflective materials. The control unit 18 may perform operations not only based on the detected positions of the marker 24, but also based on extrapolated movement (e.g., a projected path of the retro-reflective marker 24 through the detection area 30 or projected positions of marker grid occlusion) in relation to the environmental elements 88.

Figure 5:
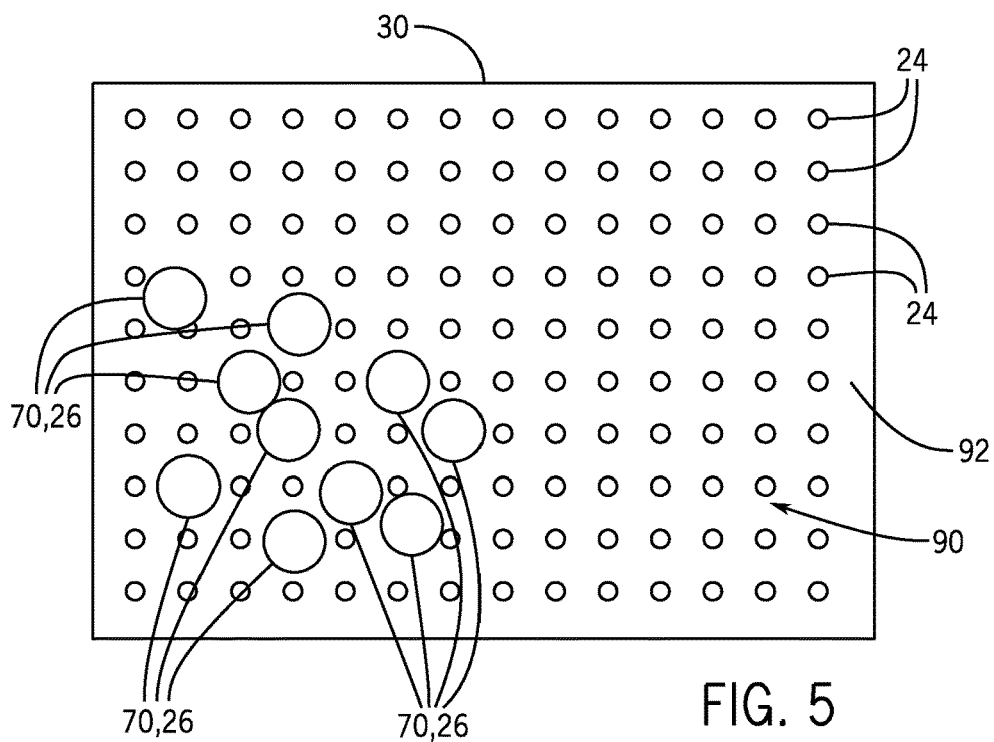
FIG. 5 is an overhead view of a room with a grid pattern of retro-reflective markers for tracking a position of people in the room via the tracking system of FIG. 1, in accordance with an embodiment of the present disclosure.

Another method for tracking one or more people 70 or objects 32 in an area is illustrated schematically in FIG. 5. Specifically, FIG. 5 represents an overhead view of a group of people 70 standing in the detection area 30. Although not illustrated, the tracking system 10 may be present directly above this detection area 30 in order to detect positions of people 70 (and other objects) present within the detection area 30 (e.g., to obtain a plan view of the detection area 30). In the illustrated embodiment, the retro-reflective markers 24 are positioned in a grid pattern 90 on a floor 92 of the detection area 30 (e.g., as a coating, pieces of tape, or similar attachment method). The retro-reflective markers 24 may be arranged in any desired pattern (e.g., grid, diamond, lines, circles, solid coating, etc.), which may be a regular pattern (e.g., repeating) or a random pattern.

This grid pattern 90 may be stored in the memory 22, and portions of the grid pattern 90 (e.g., individual markers 24) may be correlated to locations of certain environmental elements and amusement park features (e.g., the amusement park equipment 12). In this way, the position of each of the markers 24 relative to such elements may be known. Accordingly, when the markers 24 retro-reflect the electromagnetic radiation beam 28 to the detector 16, the location of the markers 24 that are reflecting may be determined and/or monitored by the control unit 18.

As illustrated, when the people 70 or objects 32 are positioned over one or more of the retro-reflective markers 24 on the floor 92, the occluded markers cannot reflect the emitted electromagnetic radiation back to the detector 16 above the floor 92. Indeed, in accordance with an embodiment, the grid pattern 90 may include retro-reflective markers 24 that are spaced apart by a distance that allows the people or objects positioned on the floor 92 to be detectable (e.g., blocking at least one of the retro-reflective markers 24). In other words, the distance between the markers 24 may be sufficiently small so that objects or people may be positioned over at least one of the retro-reflective markers 24.

In operation, the detector 16 may function to detect the electromagnetic radiation beam 28 retro-reflected from the retro-reflective markers 24 that are not covered up by people or objects located in the detection area 30. As discussed above, the detector 16 may then provide data associated with this detection to the control unit 18 for processing. The control unit 18 may perform a comparison of the detected electromagnetic radiation beam reflected off the uncovered retro-reflective markers 24 (e.g., a detected pattern) with stored positions of the completely uncovered grid pattern 90 (e.g., a stored pattern) and/or other known grid patterns resulting from blockage of certain markers 24. Based on this comparison, the control unit 18 may determine which markers 24 are covered to then approximate locations of the people 70 or objects 32 within the plane of the floor 92. Indeed, the use of a grid positioned on the floor 92 in conjunction with a single detector 16 may enable the tracking of movement in two dimensions. If higher order tracking is desired, additional grids and/or additional detectors 16 may be utilized. In certain embodiments, based on the locations of the people 70 or objects 32 in the detection area 30, the control unit 18 may adjust the operation of the amusement park equipment 12.

The process of emitting the electromagnetic radiation beam 28, sensing of the reflected electromagnetic radiation from the uncovered retro-reflective markers 24 on the floor 92, and determining a location of the people 70 may be performed by the control unit 18 numerous times over a short period in order to identify a series of locations of the people 70 moving about the floor 92 (to track motion of the group). Indeed, such procedures may essentially be performed continuously to facilitate identification of a path through which the people 70 have moved within the detection area 30 during a particular timeframe or simply in continuous series. Once the position or path one or more of the people 70 has been detected, the control unit 18 may further analyze the position or path to determine whether any actions should be performed by the equipment 12.

Figure 6:
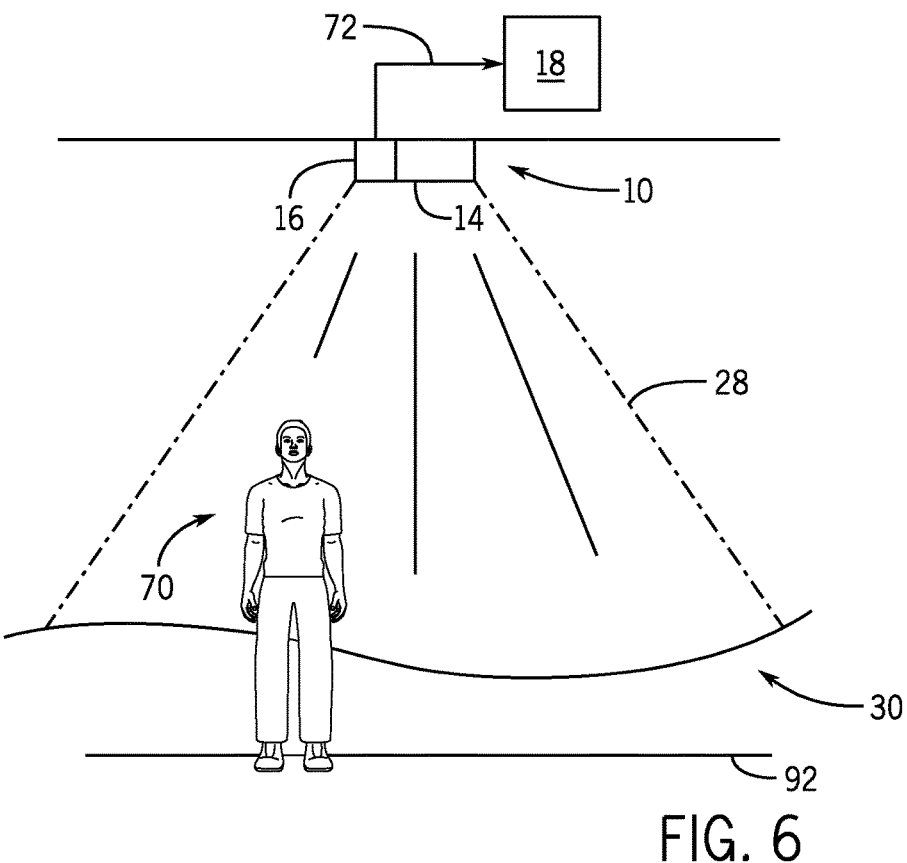
FIG. 6 is an elevational view of the tracking system of FIG. 1 tracking a person without tracking retro-reflective marker movement and without tracking retro-reflective marker occlusion, in accordance with an embodiment of the present disclosure.

As discussed in detail above with respect to FIG. 1, the control unit 18 may be configured to identify certain objects that are expected to cross the path of the electromagnetic radiation beam 28 within the detection area 30, including objects that are not marked with retro-reflective material. For example, as illustrated in FIG. 6, some embodiments of the tracking system 10 may be configured such that the control unit 18 is able to identify the person 70 (which is also intended to be representative of the object 32) located in the detection area 30, without the use of the retro-reflective markers 24. That is, the control unit 18 may receive data indicative of the electromagnetic radiation reflected back from the detection area 30, and the control unit 18 may compare a digital signature of the detected radiation to one or more possible data signatures stored in memory 22. That is, if the signature of electromagnetic radiation reflected back to the detector 16 matches closely enough to the signature of a person 70 or known object 32, then the control unit 18 may determine that the person 70 or object 32 is located in the detection area 30. For example, the control unit 18 may identify "dark spots," or regions where electromagnetic radiation was absorbed rather than reflected, within the detection area 30. These areas may have a geometry that the control unit 18 may analyze (e.g., by comparing to shapes, sizes, or other features of stored objects or people) to identify a presence, location, size, shape, etc., of an object (e.g., the person 70).

As may be appreciated with reference to FIGS. 1, 2, 3, and 6, the tracking system 10 may be positioned in a variety of locations to obtain different views of the detection area 30. Indeed, it is now recognized that different locations and combinations of locations of one or more of the tracking systems 10 (or one or more elements of the tracking system 10, such as multiple detectors 16) may be desirable for obtaining certain types of information relating to the retro-reflective markers 24 and the blockage thereof. For instance, in FIG. 1, the tracking system 10, and in particular the detector 16, is positioned to obtain an elevational view of at least the object 26 fitted with the retro-reflective marker 24 and the object 32. In FIG. 2, the detector 16 is positioned to obtain an overhead perspective view of the detection area 30, which enables detection of retro-reflective markers 24 positioned on a variety of environmental elements, moving objects, or people. In the embodiments of FIGS. 3 and 6, the detector 16 may be positioned to obtain a plan view of the detection area 30.

These different views may provide information that may be utilized by the control unit 18 for specific types of analyses and, in certain embodiments, control actions that may depend on the particular setting in which they are located. For example, in FIG. 7, the tracking system 10, and particularly the emitter 14 and the detector 16, are positioned to obtain a perspective view of the person 70 (or object 32) in the detection area 30. The detection area 30 includes the floor 92, but also includes a wall 93 on which the retro-reflective markers 24 are positioned to form the grid pattern 90. Here, the person 70 is blocking a subset of markers 24 positioned on the wall 93. The subset of markers 24 are unable to be illuminated by the emitter 14, are unable to retro-reflect the electromagnetic radiation back to the detector 16, or both, because the person 70 (also intended to represent an object) is positioned between the subset of markers 24 and the emitter 14 and/or detector 16.

The grid pattern 90 on the wall 93 may provide information not necessarily available from a plan view as shown in FIGS. 3 and 6. For example, the blockage of the retro-reflective markers 24 enables the control unit 18 to determine a height of the person 70, a profile of the person 70, or, in embodiments where there the object 32 is present, a size of the object 32, a profile of the object 32, and so forth. Such determinations may be made by the control unit 18 to evaluate whether the person 70 meets a height requirement for a ride, to evaluate whether the person 70 is associated with one or more objects 32 (e.g., bags, strollers), and may also be used to track movement of the person 70 or object 32 through the detection area 30 with a greater degree of accuracy compared to the plan view set forth in FIGS. 3 and 6. That is, the control unit 18 is better able to tie movement identified by blockage of the markers 24 to a particular person 70 by determining the person's profile, height, etc.

Similarly, the control unit 18 is better able to track the movement of the object 32 through the detection area 30 by identifying the geometry of the object 32, and tying identified movement specifically to the object 32. In certain embodiments, tracking the height or profile of the person 70 may be performed by the tracking system 10 to enable the control unit 18 to provide recommendations to the person 70 based on an analysis of the person's evaluated height, profile, etc. Similar determinations and recommendations may be provided for objects 32, such as vehicles. For example, the control unit 18 may analyze a profile of guests at an entrance to a queue area for a ride. The control unit 18 may compare the overall size, height, etc., of the person 70 with ride specifications to warn individuals or provide a confirmation that they are able to ride the ride before spending time in the queue. Similarly, the control unit 18 may analyze the overall size, length, height, etc., of a vehicle to provide parking recommendations based on available space. Additionally or alternatively, the control unit 18 may analyze the overall size, profile, etc., of an automated piece equipment before allowing the equipment to perform a particular task (e.g., movement through a crowd of people).

The pattern 90 may also be positioned on both the wall 93 and the floor 92. Accordingly, the tracking system 10 may be able to receive retro-reflected electromagnetic radiation from markers 24 on the wall 93 and the floor 92, thereby enabling detection of marker blockage and monitoring of movement in three dimensions. Specifically, the wall 93 may provide information in a height direction 94, while the floor 92 may provide information in a depth direction 96. Information from both the height direction 94 and the depth direction 96 may be correlated to one another using information from a width direction 98, which is available from both the plan and elevational views.

Indeed, it is now recognized that if two objects 32 or people 70 overlap in the width direction 98, they may be at least partially resolved from one another using information obtained from the depth direction 96. Further, it is also now recognized that the use of multiple emitters 14 and detectors 16 in different positions (e.g., different positions in the width direction 98) may enable resolution of height and profile information when certain information may be lost or not easily resolved when only one emitter 14 and detector 16 are present. More specifically, using only one emitter 14 and detector 16 may result in a loss of certain information if there is overlap between objects 32 or people 70 in the width direction 98 (or, more generally, overlap in a direction between the markers 24 on the wall 93 and the detector 16). However, embodiments using multiple (e.g., at least two) detectors 16 and/or emitters 14 may cause distinct retro-reflective patterns to be produced by the markers 24 and observed from the detectors 16 and/or emitters 14 positioned at different perspectives. Indeed, because the markers 24 are retro-reflective, they will retro-reflect electromagnetic radiation back toward the electromagnetic radiation source, even when multiple sources emit at substantially the same time. Thus, electromagnetic radiation emitted from a first of the emitters 14 from a first perspective will be retro-reflected back toward the first of the emitters 14 by the markers 24, while electromagnetic radiation emitted from a second of the emitters 14 at a second perspective will be retro-reflected back toward the second of the emitters 14 by the markers 24, which enables multiple sets of tracking information to be produced and monitored by the control unit 18.

It is also now recognized that the retro-reflective markers 24 on the wall 93 and the floor 92 may be the same, or different. Indeed, the tracking system 10 may be configured to determine which electromagnetic radiation was reflected from the wall 93 versus which electromagnetic radiation was reflected from the floor 92 using a directionality of the retro-reflected electromagnetic radiation from the wall 93 and the floor 92. In other embodiments, different materials may be used for the markers 24 so that, for example, different wavelengths of electromagnetic radiation may be reflected back toward the emitter 14 and detector 16 by the different materials. As an example, the retro-reflective markers 24 on the floor 92 and the wall 93 may have the same retro-reflective elements, but different layers that act to filter or otherwise absorb portions of the emitted electromagnetic radiation so that electromagnetic radiation reflected by the retro-reflective markers 24 on the floor 92 and wall 93 have characteristic and different wavelengths. Because the different wavelengths would be retro-reflected, the detector 16 may detect these wavelengths and separate them from ambient electromagnetic radiation, which is filtered by filter elements within the detector 16.

Figure 8:
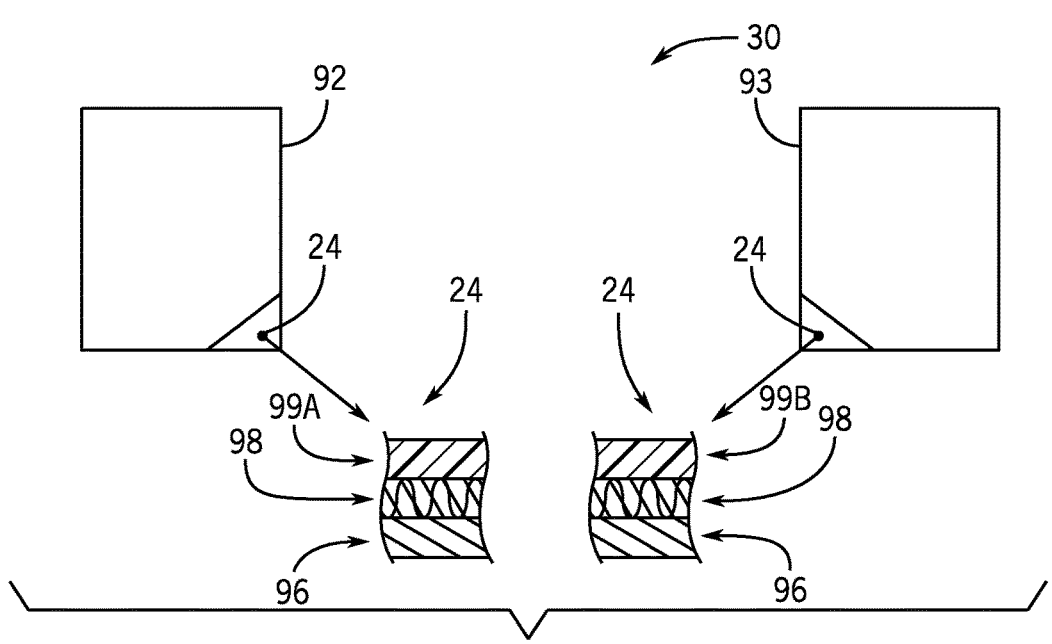
FIG. 8 illustrates cross-sections of retro-reflective markers having different coatings to enable different wavelengths of electromagnetic radiation to be reflected back toward the detector of the tracking system of FIG. 1, in accordance with an embodiment of the present disclosure.

To help illustrate, FIG. 8 depicts expanded cross-sectional views of example retro-reflective markers 24 disposed on the floor 92 and the wall 93 within the detection area 30. The markers 24 on the floor 92 and the wall 93 each include a reflective layer 96 and a retro-reflective material layer 98, which may be the same or different for the floor 92 and wall 93. In the illustrated embodiment, they are the same. During operation, electromagnetic radiation emitted by the emitter 14 may traverse a transmissive coating 99 before striking the retro-reflective material layer 98. Accordingly, the transmissive coating 99 may be used to adjust the wavelengths of electromagnetic radiation that are retro-reflected by the markers. In FIG. 8, the markers 24 on the floor 92 include a first transmissive coating 99A, which is different than a second transmissive coating 99B in the markers 24 on the wall 93. In certain embodiments, different optical properties between the first and second transmissive coatings 99A, 99B may cause a different bandwidth of electromagnetic radiation to be reflected by the markers 24 on the floor 92 and the markers 24 on the wall 93. While presented in the context of being disposed on the floor 92 and the wall 93, it should be noted that markers 24 having different optical properties may be used on a variety of different elements within the amusement park, such as on people and environmental elements, people and moving equipment, and so on, to facilitate separation for processing and monitoring by the control unit 18.

Any one or a combination of the techniques set forth above may be used to monitor a single object or person, or multiple objects or people. Indeed, it is presently recognized that a combination of multiple retro-reflective marker grids (e.g., on the floor 92 and wall 93 as set forth above), or a combination of one or more retro-reflective marker grids and one or more tracked retro-reflective markers 24 fixed on a movable object or person, may be utilized to enable three-dimensional tracking, even when only one detector 16 is utilized. Further, it is also recognized that using multiple retro-reflective markers 24 on the same person or object may enable the tracking system 10 to track both position and orientation.

In this regard, FIG. 9A illustrates an embodiment of the object 26 having multiple retro-reflective markers 24 positioned on different faces of the object 26. Specifically, in the illustrated embodiment, the retro-reflective markers 24 are disposed on three different points of the object 26 corresponding to three orthogonal directions (e.g., X, Y, and Z axes) of the object 26. However, it should be noted that other placements of the multiple retro-reflective markers 24 may be used in other embodiments. In addition, the tracking depicted in FIG. 9A may be performed as generally illustrated, or may also utilize a grid of the retro-reflective markers 24 as shown in FIG. 7.

As noted above, the tracking system 10 may include multiple detectors 16 configured to sense the electromagnetic radiation that is reflected back from the object 26, for example. Each of the retro-reflective markers 24 disposed on the object 26 may retro-reflect the emitted electromagnetic radiation beam 28 at a particular, predetermined frequency of the electromagnetic spectrum of the electromagnetic radiation beam 28. That is, the retro-reflective markers 24 may retro-reflect the same or different portions of the electromagnetic spectrum, as generally set forth above with respect to FIG. 8.

The control unit 18 is configured to detect and distinguish the electromagnetic radiation reflected at these particular frequencies and, thus, to track the motion of each of the separate retro-reflective markers 24. Specifically, the control unit 18 may analyze the detected locations of the separate retro-reflective markers 24 to track the roll (e.g., rotation about the Y axis), pitch (e.g., rotation about the X axis), and yaw (e.g., rotation about the Z axis) of the object 26. That is, instead of only determining the location of the object 26 in space relative to a particular coordinate system (e.g., defined by the detection area 30 or the detector 16), the control unit 18 may determine the orientation of the object 26 within the coordinate system, which enables the control unit 18 to perform enhanced tracking and analyses of the movement of the object 26 in space and time through the detection area 30. For instance, the control unit 18 may perform predictive analyses to estimate a future position of the object 26 within the detection area 30, which may enable enhanced control over the movement of the object 26 (e.g., to avoid collisions, to take a particular path through an area).

In certain embodiments, such as when the object 26 is a motorized object, the tracking system 10 may track the position and orientation of the object 26 (e.g., a ride vehicle, an automaton, an unmanned aerial vehicle) and control the object 26 to proceed along a path in a predetermined manner. The control unit 18 may, additionally or alternatively, compare the results to an expected position and orientation of the object 26, for example to determine whether the object 26 should be controlled to adjust its operation, and/or to determine whether the object 26 is operating properly or is in need of some sort of maintenance. In addition, the estimated position and orientation of the object 26, as determined via the tracking system 10, may be used to trigger actions (including preventing certain actions) by other amusement park equipment 12 (e.g., show effects). As one example, the object 26 may be a ride vehicle and the amusement park equipment 12 may be a show effect. In this example, it may be desirable to only trigger the amusement park equipment 12 when the object 26 is in the expected position and/or orientation.

Continuing with the manner in which tracking in three spatial dimensions may be preformed, FIG. 9B depicts an example of the object having a first marker 24A, a second marker 24B, and a third marker 24C positioned in similar positions as set forth in FIG. 9A. However, from the perspective of a single one of the detectors 16, the detector 16 may see a two-dimensional representation of the object 16, and the markers 24A, 24B, 24C. From this first perspective (e.g., overhead or bottom view), the control unit 18 may determine that the first and second markers 24A, 24B are separated by a first observed distance d1, the first and third markers 24A, 24C are separated by a second observed distance d2, and the second and third markers 24B, 24C are separated by a third observed distance d3. The control unit 18 may compare these distances to known or calibrated values to estimate an orientation of the object 26 in three spatial dimensions.

Moving to FIG. 9C, as the object 26 rotates, the detector 16 (and, correspondingly, the control unit 18) may detect that the apparent shape of the object 26 is different. However, the control unit 18 may also determine that the first and second markers 24A, 24B are separated by an adjusted first observed distance d1', the first and third markers 24A, 24C are separated by an adjusted second observed distance d2', and the second and third markers 24B, 24C are separated by an adjusted third observed distance d3'. The control unit 18 may determine a difference between the distances detected in the orientation in FIG. 9B and the distances detected in the orientation in FIG. 9C to determine how the orientation of the object 26 has changed to then determine the orientation of the object 26. Additionally or alternatively, the control unit 18 may compare the adjusted observed distances d1', d2', d3' resulting from rotation of the object 26 to stored values to estimate an orientation of the object 26 in three spatial dimensions, or to further refine an update to the orientation determined based on the change between the distances in FIGS. 9B and 9C.

As set forth above, present embodiments are directed to, among other things, the use of the disclosed tracking system 10 to track objects and/or people within an amusement park environment. As a result of this tracking, the control unit 18 may, in some embodiments, cause certain automated functions to be performed within various subsystems of the amusement park. Accordingly, having described the general operation of the disclosed tracking system 10, more specific embodiments of tracking and control operations are provided below to facilitate a better understanding of certain aspects of the present disclosure.

Figure 10:
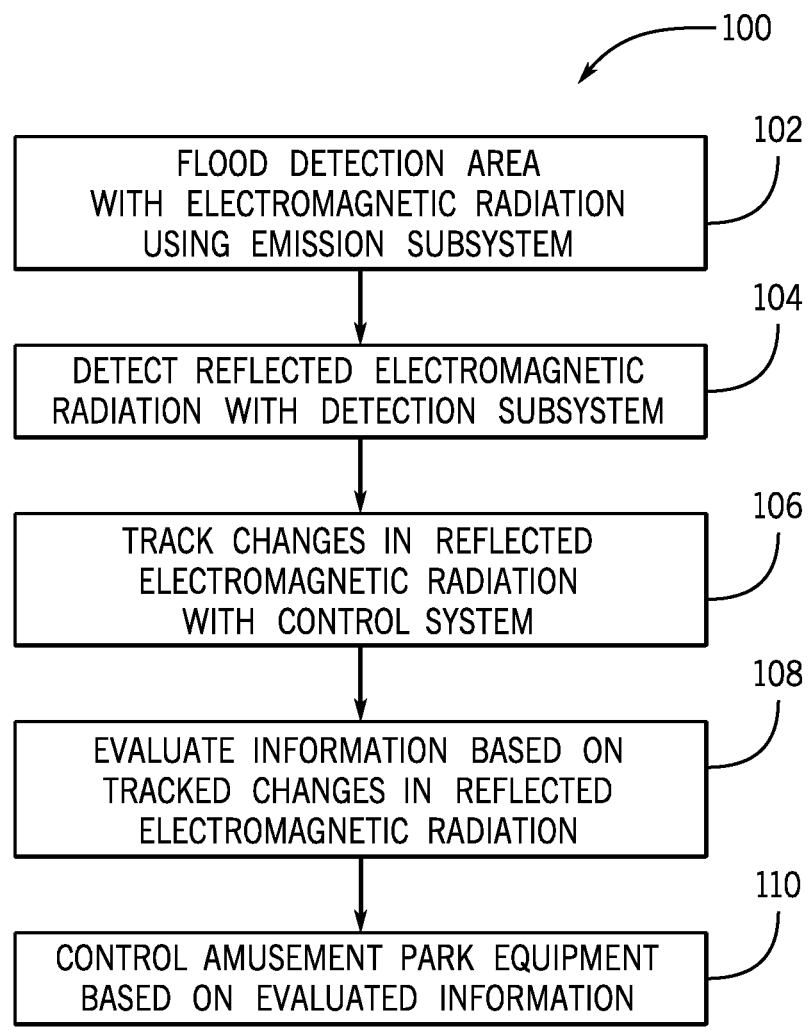
FIG. 10 is a flow diagram illustrating an embodiment of a method of tracking reflection and controlling amusement park elements based on the tracked reflection using the tracking system of FIG. 1, in accordance with an embodiment of the present disclosure.

Moving now to FIG. 10, an embodiment of a method 100 of monitoring changes in reflected electromagnetic radiation to track movement of a target and control amusement park equipment as result of this monitoring is illustrated as a flow diagram. Specifically, the method 100 includes the use of one or more of the emitters 14 (e.g., an emission subsystem) to flood (block 102) the detection area 30 with electromagnetic radiation (e.g., electromagnetic radiation beam 28) using the emission subsystem. For instance, the control unit 18 may cause one or more of the emitters 14 to intermittently or substantially continuously flood the detection area 30 with emitted electromagnetic radiation. Again, the electromagnetic radiation may be any appropriate wavelength that is able to be retro-reflected by the retro-reflective markers 24. This includes, but is not limited to, ultraviolet, infrared, and visible wavelengths of the electromagnetic spectrum. It will be appreciated that different emitters 14, and in some embodiments, different markers 24, may utilize different wavelengths of electromagnetic radiation to facilitate differentiation of various elements within the area 30.

After flooding the detection area 30 with electromagnetic radiation in accordance with the acts generally represented by block 102, the method 100 proceeds to detecting (block 104) electromagnetic radiation that has been reflected from one or more elements in the detection area 30 (e.g., the retro-reflective markers 24). The detection may be performed by one or more of the detectors 16, which may be positioned relative to the emitter 14 as generally set forth above with respect to FIGS. 1 and 2. As described above and set forth in further detail below, the features that perform the detection may be any appropriate element capable of and specifically configured to capture retro-reflected electromagnetic radiation and cause the captured retro-reflective electromagnetic radiation to be correlated to a region of the detector 16 so that information transmitted from the detector 16 to the control unit 18 retains position information regarding which of the markers 24 reflected electromagnetic radiation to the detector 16. As one specific but non-limiting example, one or more of the detectors 16 (e.g., present as a detection subsystem) may include charge coupled devices within an optical camera or similar feature.

As described above, during the course of operation of the tracking system 10, and while people 70 and/or objects 26, 32 are present within the detection area 30, it may be expected that changes in reflected electromagnetic radiation will occur. These changes may be tracked (block 106) using a combination of the one or more detectors 16 and routines performed by processing circuitry of the control unit 18. As one example, tracking changes in the reflected electromagnetic radiation in accordance with the acts generally represented by block 106 may include monitoring changes in reflected patterns from a grid over a certain period of time, monitoring changes in spectral signatures potentially caused by certain absorptive and/or diffusively or spectrally reflective elements present within the detection area 30, or by monitoring certain moving retro-reflective elements. As described below, the control unit 18 may be configured to perform certain types of tracking of the changes in reflection depending on the nature of the control to be performed in a particular amusement park attraction environment.

At substantially the same time or shortly after tracking the changes in reflected electromagnetic radiation in accordance with the acts generally represented by block 106, certain information may be evaluated (block 108) as a result of these changes by the control unit 18. In accordance with one aspect of the present disclosure, the evaluated information may include information pertaining to one or more individuals (e.g., amusement park guests, amusement park employees) to enable the control unit 18 to monitor movement and positioning of various individuals, and/or make determinations relating to whether the person is appropriately positioned relative to certain amusement park features. In accordance with another aspect of the present disclosure, the information evaluated by the control unit 18 may include information relating to objects 26, 32, which may be environmental objects, moving objects, the amusement park equipment 12, or any other device, item, or other feature present within the detection area 30. Further details regarding the manner in which information may be evaluated is described in further detail below with reference to specific examples of amusement park equipment controlled at least in part by the control unit 18.

As illustrated, the method 100 also includes controlling (block 110) amusement park equipment based on the information (e.g., monitored and analyzed movement of people and/or objects) evaluated in accordance with acts generally represented by block 108. It should be noted that this control may be performed in conjunction with concurrent tracking and evaluation to enable the control unit 18 to perform many of the steps set forth in method 100 on a substantially continuous basis and in real-time (e.g., on the order of the rate of capture of the detector 16), as appropriate. In addition, the amusement park equipment controlled in accordance with the acts generally represented by block 110 may include automated equipment such as ride vehicles, access gates, point-of-sale kiosks, informational displays, or any other actuatable amusement park device. As another example, the control unit 18 may control certain show effects such as the ignition of a flame or a firework as a result of the tracking and evaluation performed in accordance with method 100. More details relating to certain of these specific examples are described in further detail below.

Figure 11:
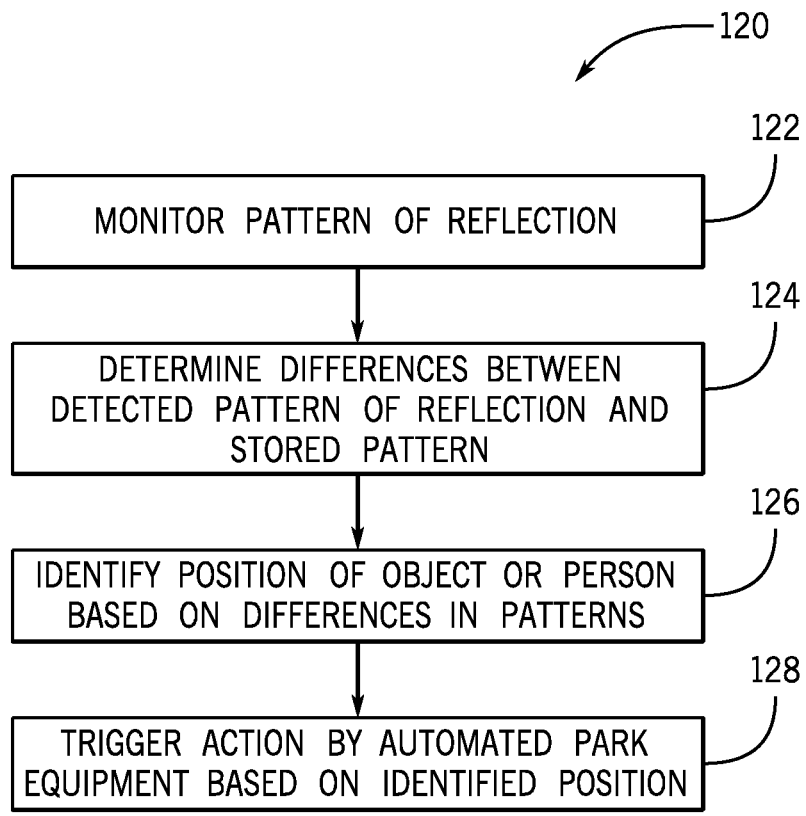
FIG. 11 is a flow diagram illustrating an embodiment of a method of tracking reflection to identify a position of a person or an object and controlling amusement park elements based on the identified position using the tracking system of FIG. 1, in accordance with an embodiment of the present disclosure.

In accordance with a more particular aspect of the present disclosure, the present embodiments relate to the monitoring of people within an amusement park attraction area and controlling park equipment based on this information. In accordance with this aspect, FIG. 11 illustrates an embodiment of a method 120 for monitoring patterns of reflection and controlling automated amusement park equipment as a result of monitoring people within an amusement park area.

As illustrated, the method 120 includes monitoring (block 122) a pattern of reflection. The monitoring performed in accordance with the acts generally represented by block 122 may be considered to be performed using the tracking system 10, either alone or in combination with other features of an amusement park control system. To facilitate discussion, the disclosure set forth below may refer to a control system that is communicatively coupled to a number of different devices including the tracking system 10, as well as the amusement park equipment to be controlled.

Monitoring the pattern of reflection in accordance with block 122 may include monitoring a number of different features in the manner described above with respect to FIGS. 3-9. Accordingly, the monitoring performed in accordance with block 122 may include monitoring a pattern generated over time by a marker being tracked within the detection area 30, or may include monitoring a pattern of reflection generated at any one time instance by a plurality of retro-reflective markers 24 positioned within the detection area 30. Further still, the monitoring performed in accordance with block 122 may not involve the use of the markers 24, such as in situations where the tracking system 10 is employed to track specular and/or diffuse reflection. In some embodiments, a combination of these patterns may be monitored in accordance with block 122, for example when one or more of the retro-reflective markers 24 is positioned on the person 70, while other retro-reflective markers 24 are positioned on other objects 32, the wall 93, the floor 92, or any other environmental feature in the detection area 30.

The method 120 also includes determining (block 124) differences between detected patterns of reflection and stored patterns of reflection. For example, a detected pattern may be considered to be a pattern generated either at any one instance (e.g. using a grid) or over time by a single or multiple tracked retro-reflective markers 24. The stored patterns may be considered to represent patterns stored in the memory 22 of the control unit 18, which may be correlated to different types of information, such as behavioral information, certain types of movement or locations, height or other geometric information, or the like. In one embodiment, the control unit 18 may determine differences between the detected pattern of reflection and the stored pattern of reflection to further determine whether the detected pattern correlates to a particular control action associated with stored pattern.

The method 120 may also include using the identified position to cause triggering (including preventing) of automated park equipment (block 128). For example, an identified position may cause the control unit 18 to trigger a show effect, dispatch or halt a ride vehicle, open or close an access gate, trigger surveillance, or similar actions.

Figure 12:
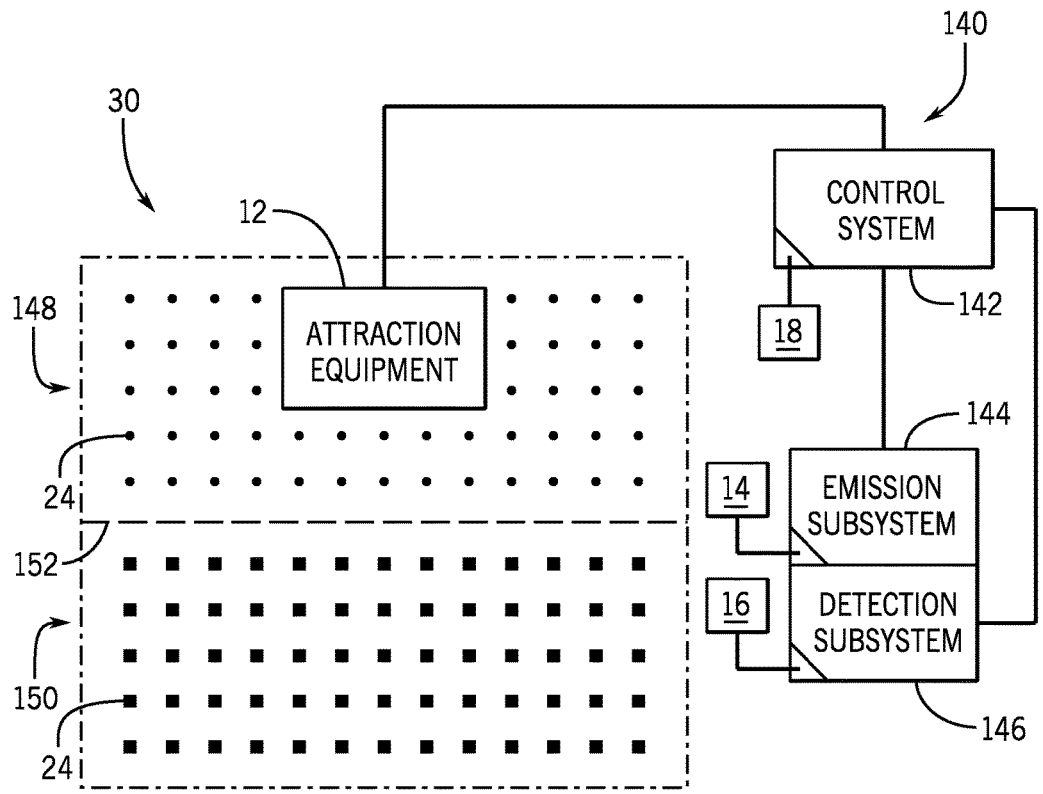
FIG. 12 is an overhead view of an embodiment of an attraction area in which the tracking system of FIG. 1 detects proximity of people or objects relative to automated attraction equipment, and controls the attraction equipment as a result of the proximity detection, in accordance with an embodiment of the present disclosure.

An example embodiment of an amusement park attraction and control system 140 that may perform all or part of method 120 is depicted in FIG. 12. Specifically, the system 140 of FIG. 12 includes a control system 142, which may include processing circuitry configured to perform functions that are specific to a particular park attraction and coordinate those actions with the tracking system 10. Indeed, as illustrated, the control system 142 may include the control unit 18. As also illustrated, the control system 142 is communicatively coupled to an emission subsystem 144, which includes one or more of the emitters 14, and a detection subsystem 146, which includes one or more of the detectors 16.

Using information obtained from the detection subsystem 146, as well as routines and reference information stored in the processing circuitry of the control unit 18, the control system 142 may control automated attraction equipment 12 to which it is communicatively and/or operatively coupled. The particular embodiment of the amusement park attraction and control system 140 illustrated in FIG. 12 is configured to perform various monitoring and control actions based at least in part on monitoring patterns of reflection obtained from retro-reflective markers 24 positioned on static and/or moving elements of the detection area 30. As an example, the detection area 30 may represent an amusement park ride, a section of the amusement park containing various show effects that are triggered by the control system 142, or the like.

In the particular embodiment illustrated in FIG. 12, the retro-reflective markers 24 may be considered to be divided into a first subset 148 and a second subset 150. Each marker 24 of the first subset of retro-reflective markers 24 has a distance from the attraction equipment 12 that is at or below a threshold distance from the attraction equipment 12. Indeed, the first subset 148 of retro-reflective markers 24 may be considered to represent a proximity region of the attraction equipment 12, meaning that any object or person positioned over one or more of the retro-reflective markers 24 of the first subset 148 may be considered to be positioned in close proximity to the attraction equipment 12. On the other hand, the markers 24 of the second subset 150 have a distance that is outside of the predetermined distance defining the first subset 148. Accordingly, the second subset 150 of markers 24 may be considered to be beyond (e.g., outside of) a proximity boundary 152 associated with the attraction equipment 12. Any object or person positioned over the second subset 150 may therefore be considered to not be in a close proximity to the attraction equipment 12.

In operation, the control system 142 may monitor, using the emission subsystem 144 and the detection subsystem 146, blockage of certain of the retro-reflective markers 24. As one example, the control system 142 may monitor the first subset 148 of markers 24 and, as a result of any identification that one or more of the markers 24 of the first subset 148 is blocked by an object or person, may cause the attraction equipment 12 to trigger. This triggering may be triggering of a show effect, triggering of an automated gate, or similar action. However, the triggering of the attraction equipment 12 may not necessarily denote triggering of an amusement feature. For instance, triggering of the attraction equipment 12, in some instances, may cause certain failsafes to be engaged that prevent certain actions by the attraction equipment 12. One example of such a control action might be to prevent movement of the attraction equipment 12.

Figure 13:
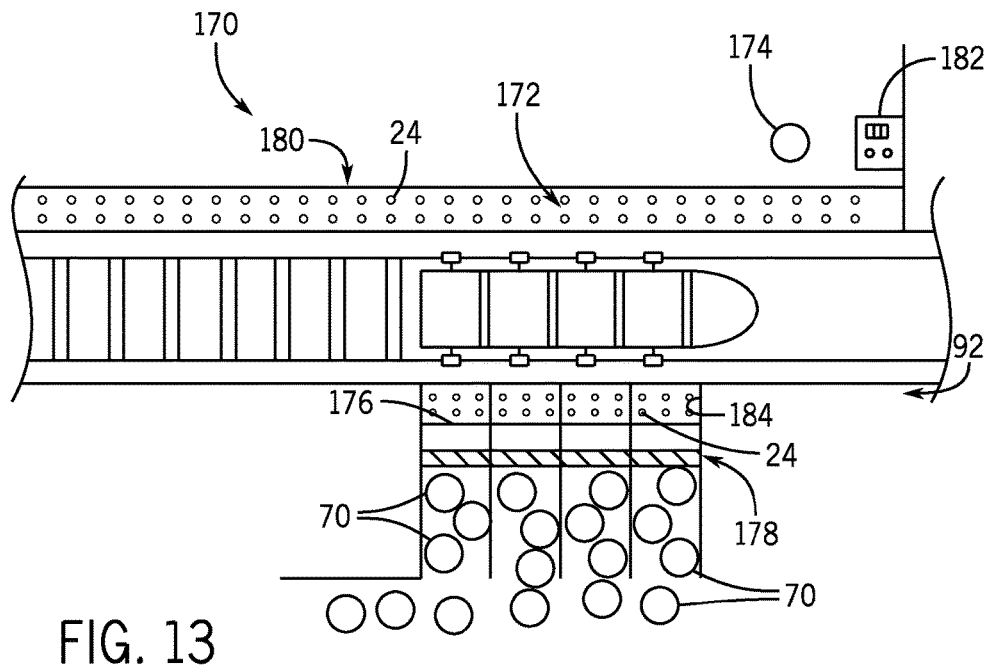
FIG. 13 is an overhead view of a loading area for an amusement park ride with a retro-reflective marker line for tracking a position of people on the loading area via the tracking system of FIG. 1, in accordance with an embodiment of the present disclosure.

A more specific example of the amusement park attraction and control system 140 is shown in FIG. 13, which is an overhead view of a loading area 170 associated with an amusement park ride. As may be appreciated, the loading area 170, or portions thereof, may be considered to represent a specific embodiment of the detection area 30. In accordance with present embodiments, the tracking system 10 may be used to ensure that proper procedures are followed while loading and unloading people 70 from a ride vehicle 172, and also to enhance operational efficiency associated with the ride. Here, the control system 142 and equipment associated with the tracking system 10 are present, but are not shown in FIG. 13 for clarity.

As an example of the operation of the system 140 in the embodiment of FIG. 13, the control system 142 may have a certain set of rules applied to its tracking and monitoring functionality, which may result in certain actions being taken within the bounds of these rules. For instance, it may be desirable for a ride operator 174 to be on the loading area 170 at all times. The control system 142, therefore, may be configured to monitor the loading area 170 to detect the ride operator 174 on the platform and to send a signal to stop ride operations if the ride operator 174 is not present. That is, the detection subsystem 144 may detect the operator 174, with or without a retro-reflective marker 24 disposed on the operator 174, and determine whether the operator 174 is present on the loading area 170 or in a specified section of the loading area 170. Referring to the discussion relating to pattern detection set forth above, the control system 142 may monitor a relatively simple pattern of reflection (e.g., a single reflective source indicative of the operator 174) and, if the control system 142 determines that this pattern changes (e.g., a reflective source indicative of the operator 174 is no longer present), the control system 142 causes operations of the loading area 170 and/or ride vehicle 172 to cease.

At another portion of the loading area 170 in FIG. 13, people 70 waiting to board the ride vehicle 172 are queued behind gates 176. It may be desirable for these gates 176 to open automatically (e.g., using a gate actuation device) when it is time for the people 70 to board the ride vehicle 172. To ensure that the people 70 are not standing too close to the gates 176 or leaning on the gates 176 when it is time for the gates 176 to be opened, the control system 142 may determine where the people 70 are standing in relation to the gates 176 and send a control signal to the gate actuation device to control whether or not the gates 176 open. The control system 142 may perform this evaluation using any one or a combination of the techniques set forth with respect to FIGS. 3-7, depending on the presence (or blockage) of certain reflective elements (e.g., retro-reflective markers 24).

In some embodiments and as illustrated, there may be a boundary line 178 on the floor 92 of the loading area 170 located a desired distance from the gates 176. This line 178 may be equipped with retro-reflective markers 24 or may be delineated by a retro-reflective coating applied to the floor 92. In other words, the boundary line 178 may serve as a retro-reflective version of the proximity boundary 152 discussed above with respect to FIG. 12.

Thus, when any of the people 70 cross the line 178 or stand on the line 178, the control system 142 does not detect electromagnetic radiation reflected from the portion of the line 178 that is covered (detects a change in the reflective pattern associated with the line 178). In such a situation, the control unit 18 of the tracking system 10 may send a signal to the gate actuation device that allows the gates 176 to be opened when the line 178 is fully visible and, thus, reflecting the full amount of electromagnetic radiation back to the detector 16. However, the control unit 18 of the tracking system 10 may send a signal to the gate actuation device that prevents the gates 176 from being opened when the line 178 is partially or fully covered by the people 70 blocking the retro-reflective markers 24 or coating. In some embodiments, the control unit 18 may signal the equipment 12 (e.g., speaker system) to provide an audible indication telling the people 70 in line to step back behind the line 178. Other effects may be controlled based on the detection of the retro-reflective line 178 on the loading area 170 as well.

The amusement park attraction and control system 140 may utilize additional techniques to further enhance the automation of the ride attraction. For example, as shown in FIG. 13, the operator 174 is positioned behind a ride boundary region 180. The ride boundary region 180 may include a plurality of retro-reflective markers 24 generally defining the boundary region 180, and the control system 142 may monitor reflection associated with the region 180 to control automated operations of the ride vehicle 172. As an example, if the control system 142 determines that the boundary region 180, or a portion thereof, is covered (using the tracking system 10), the control system 142 may generate an output that causes the ride vehicle 172 to be immobilized at least until the region 180 is no longer covered. Further, the control system 142 may monitor reflection from the operator 174, using the tracking system 10, and, if the control system 142 determines that the ride vehicle 172 is loaded and the operator 174 is away from the ride vehicle 172 at a point beyond the boundary region 180, the control system 142 may cause automatic departure of the ride vehicle 172.

As an example, the operator 174 may initiate a "just in time" vehicle departure procedure at a workstation 182 communicatively coupled to or serving as a part of the control system 142. The just in time vehicle departure procedure may initiate a routine to be performed by the control system 142 in which the control system 142 monitors the boundary region 180 for the presence of the operator 174. While the boundary region 180 is occupied by the operator 174, the control system 142 may cause the ride vehicle 172 to become immobilized (e.g., by causing a physical restraint of movement of the ride vehicle 172 using, for example, brakes).

The control system 142 may also evaluate similar information relating to ride passengers using, for example, retro-reflective markers 24 positioned within another boundary region 184 located between the ride vehicle 172 and the gates 176. Thus, if the control system 142, using the tracking system 10, determines that any of the retro-reflective markers 24 in the additional boundary region 184 are covered, the control system 142 may immobilize the ride vehicle 172.

The control system 142 may also, using the tracking system 10, perform additional checks once the additional boundary region 184 is no longer occupied. For instance, the control system 142 may evaluate whether passengers in the vehicle are properly restrained using retro-reflective markers 24 positioned on seats in the ride vehicle 172. After determining that the riders are properly restrained and that there are no individuals in the additional boundary region 184, the control system 142 may evaluate the position of the operator 174. Once the control system 142 determines that the operator 174 has left the boundary region 180 and is away from the ride vehicle 172 (e.g., by determining the operator's trajectory before leaving the region 180), the control system 142 may generate an output that causes the ride vehicle 172 to automatically depart the loading area 170. Accordingly, the ride operator 174 does not necessarily have to perform manual checks, perform an activation, and/or does not necessarily have to stand in one particular spot to allow the ride vehicle 172 to depart.

Figure 14:
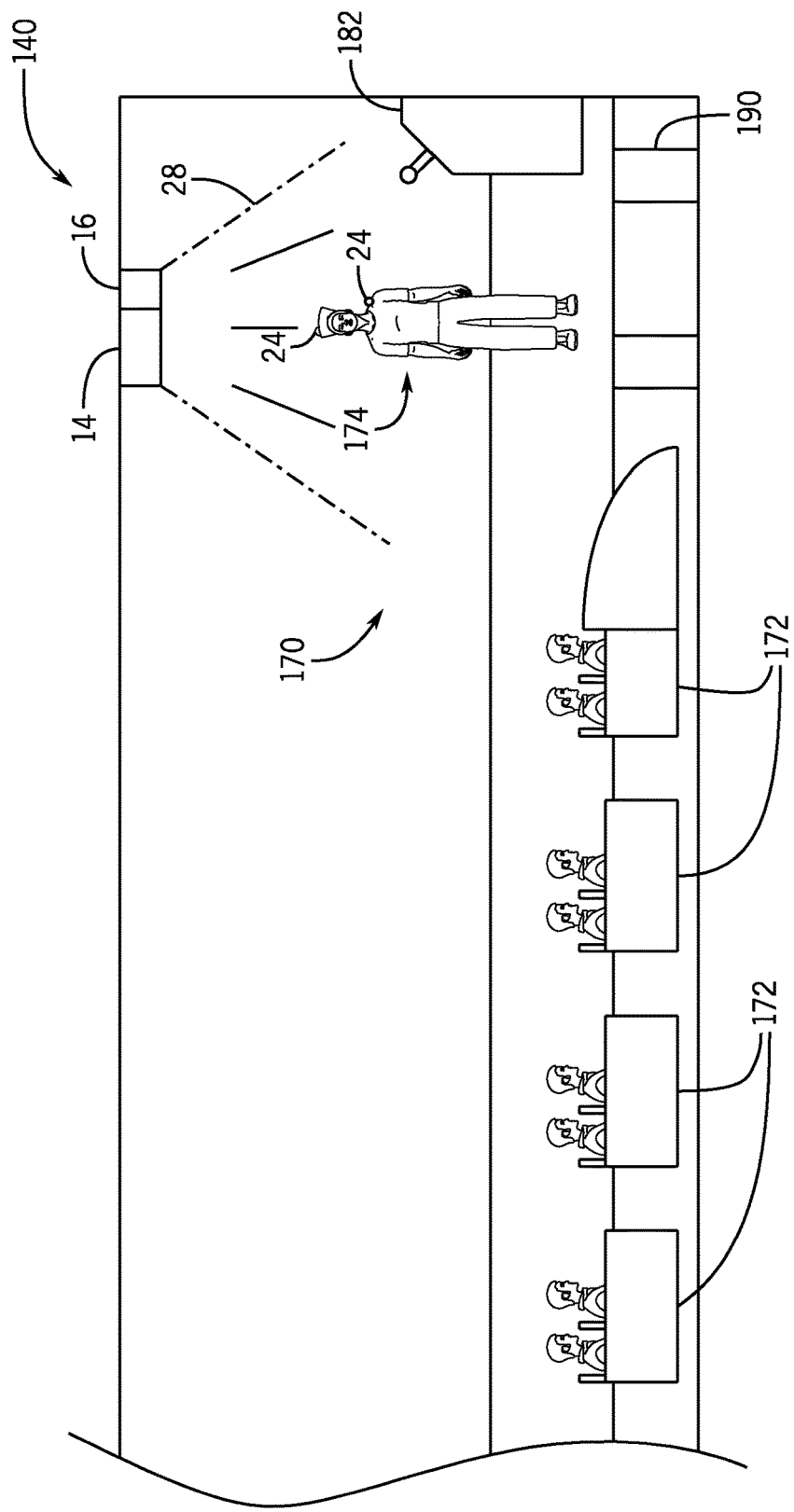
FIG. 14 is a side view of an amusement park ride operator wearing clothes with retro-reflective markers to enable the operator to control a ride vehicle of the park ride using the tracking system of FIG. 1, in accordance with an embodiment of the present disclosure.

Continuing with the example of the ride vehicle 172 and referring now to FIG. 14, which is a side view of the system 140, present embodiments also include enabling the operator 174 to use the tracking system 10 to stop the ride wirelessly and without using batteries (e.g., by causing the control system 142 to detect changes in reflective patterns). For example, in some instances, it may be desirable to stop the ride while the ride vehicle 172 is in the middle of the ride and not docked at the loading area 170. At these times, the operator 174 on the loading area 170 may be responsible for initiating a machine stop of the ride. Since the operator 174 may not always be near the workstation 182 (e.g., including a manual machine stop lever, button, or other mechanical device) or other control device on the loading area 170, the operator 174 may instead be outfitted with clothes that have one or more retro-reflective markers 24 tracked by the system 142 for control purposes. Thus, the operator 174 may cover specific portions of the clothing (e.g., specific markers 24) to cause operations of the ride vehicle 172 to be adjusted (e.g., to cause the vehicle 172 to become immobilized or slow down).

For instance, the tracking system 10, which includes the emitter 14 and the detector 16, may be positioned overhead along the ceiling of the loading area 170. The tracking system 10 may function as a wireless machine stop trigger device that does not rely on batteries at the position of the operator 174. More specifically, the operator 174 may trigger the machine stop by covering one or both of the retro-reflective markers 24, and the tracking system 10 may detect the covering of the retro-reflective markers 24 (e.g., using the detector 16). In response to this detection, the control system 142 may then send a control signal to the ride vehicle 172, to a braking system on a path 190 (e.g., track) of the ride, and/or to a control panel for the ride, to bring the ride vehicle 172 to a stop. This tracking system 10 may allow the operator 174 to initiate a machine stop of the ride from any location within view of the emitter 14 and the detector 16, thereby increasing the flexibility of where the operator 174 can go on the loading area 170.

Enabling control by the operator 174 without the need for a handheld device may be particularly useful not only for the ride vehicle 172, but also in settings where electronics may be sensitive to environmental conditions. For example, outdoor rides or waterpark rides may be particularly damaging to electronic devices, even those with a relatively simplistic design. Accordingly, to reduce the likelihood that a control device is subjected to potentially damaging conditions, a ride may instead (or in combination or as a supplement) use the tracking system 10.

Thus, if a waterpark ride needs to be shut down, the lifeguard may simply cover a retro-reflective marker 24 (e.g., a patch sewn into clothing) that is otherwise visible to the detector 16. When the detector 16 no longer detects the retro-reflective marker 24, the control unit 18 may signal the waterpark attraction to stop the flow of water or to send an alert to the other lifeguards working at the waterpark attraction. Since the emitter 14 and the detector 16 may be positioned away from the water, the tracking system 10 provides a relatively easy to use and environmentally robust method for providing a machine stop from any position at the loading area of the waterpark attraction.

Figure 15:
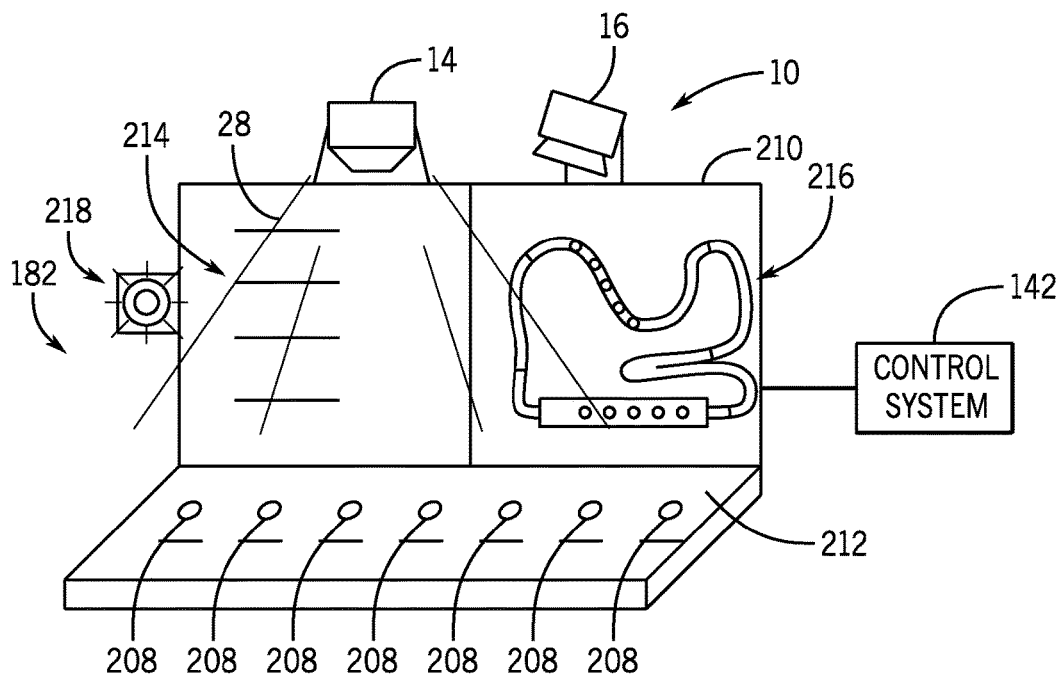
FIG. 15 is a perspective view of a control panel using the tracking system of FIG. 1, in accordance with an embodiment of the present disclosure.

Another implementation of the tracking system 10 may be used in the context of a control panel for an amusement park attraction, or for any other application utilizing a control panel. FIG. 15 illustrates an embodiment of the workstation 182 that may be used to monitor and/or control operations of an amusement park attraction (e.g., ride vehicle 172). The workstation 182 functions as a user interface for an operator (e.g., operator 174) to input control commands and to read, hear, or otherwise observe the current operations of the amusement park attraction. The tracking system 10 may be applied to the workstation 182 in a way that allows the operator 174 to enable machine functions of the amusement attraction by covering up "buttons" 208 made from or otherwise including retro-reflective markers 24 disposed in specific areas of the workstation 182. The illustrated workstation 182 includes the emitter 14 and the detector 16 coupled to an upper portion 210 of the workstation 182 for detecting which retro-reflective markers 24 are covered up by the operator 174 at a given time. Accordingly, the control unit 18 (part of the control system 142) may monitor a lower region 212 disposed below the emitter 14 and the detector 16 for changes in reflection (e.g., changes in patterns of reflection) due to blockage of one or more of the retro-reflective buttons 208. Further, the control unit 18 may also be configured to recognize combinations of the buttons 208 being covered. For example, relatively simple operations may be performed by covering a single retro-reflective button 208, while more complex operations (e.g., a servicing mode of the amusement park attraction) may be initiated using specific combinations of covered and uncovered retro-reflective buttons 208. Further still, other operations may be carried out using specific sequences of covering and uncovering the retro-reflective buttons 208. For example, the operator 174 may cover retro-reflective buttons 208 in a linear sequence from left to right, which may increase a speed of the ride, increase a volume of a set of speakers, increase light intensity, and so forth. Performing the example sequence in reverse may then have an effect opposite to those noted above (reduce speed, reduce volume, reduce light intensity).

Once the operator has covered one or more retro-reflective markers 24 (e.g., pressed the "buttons") of the workstation 182 to enable a control function, the workstation 182 may provide tactile, visual, or audible feedback to notify the operator of the buttons pressed and/or the commands sent to control the amusement attraction. For example, the workstation 182 may include various displays that illustrate the commands input to the workstation 182 and the expected effect of these commands. In the illustrated embodiment, the workstation 182 includes a written command display 214 that lists the commands input via the operator 174, as well as a visual display 216 of the amusement attraction being affected by the control inputs. In some embodiments, the workstation 182 may include an auditory feedback mechanism 218 that outputs an audible signal confirming the commands input into the workstation 182 via the operator. In addition, an area of the workstation 182 surrounding the retro-reflective markers 24 may light up in some embodiments to confirm that the button has been selected. Other embodiments of the workstation 182 may use the tracking system 10 to provide relatively simple to operate control input mechanisms. For example, sliding covers may operate like drawers to cover and uncover certain of the retro-reflective markers 24 to activate or deactivate certain operations. Indeed, it is now recognized that the use of markers 24 rather than mechanisms with moving parts (e.g., depressible buttons) to provide operator input may reduce the maintenance associated with such control panels.

As should be appreciated from the foregoing description, many functions associated with an amusement park attraction may be automated and/or controlled using the disclosed tracking system 10. As noted above, the control system 142 may perform a number of control actions based not only on covering single markers or even combinations of markers, but also based on covering markers disposed proximate certain amusement park attractions. Indeed, in certain embodiments, there may be multiple pieces of attraction equipment that are each automated and controlled by the control system 142 based on coverage of retro-reflective markers 24 associated with each piece of attraction equipment. Such embodiments may be further appreciated with reference to FIG. 16, which depicts the use of the tracking system 10 in combination with stages having various show effects (e.g., stunt show effects).

Figure 16:
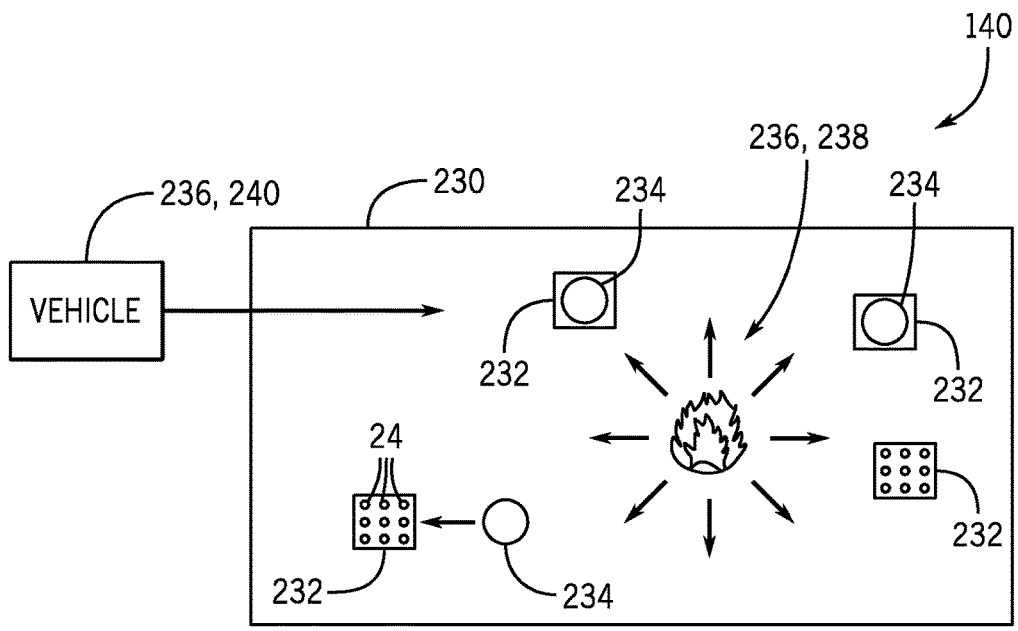
FIG. 16 is an overhead view of a stage with retro-reflective markers in certain blocking positions on the stage for use with the tracking system of FIG. 1, in accordance with an embodiment of the present disclosure.

Specifically, FIG. 16 is an overhead view of an embodiment of the amusement park tracking and control system 140 having a stage area 230 functioning as the detection area 30. The view depicted in FIG. 16 may be considered to represent the perspective of the emitter 14 and the detector 16. Accordingly, they are not shown in the illustrated embodiment for clarity. However, it should be appreciated that they may have a variety of different positions relative to the stage area 230 that enables an appropriate view of blockage of markers 24 on the stage. In other words, rather than obtaining only a plan view, the emitter 14 and detector 16 may be positioned to obtain an overhead perspective view, an elevational view, etc.

The stage area 230 may be equipped with the retro-reflective markers 24 in certain blocking regions 232 where people 70 (in this embodiment, actors 234) are supposed to stand at certain times. When the actors 234 reach their appropriate positions on the blocking regions 232, they cover up the retro-reflective markers 24, thereby signaling the control unit 18 to command the initiation of controlled show effects 236. These show effects 236 may include stunt effects, such as a flame effect 238 on the stage area 230. The control unit 18 may not command the show effects 236 until the actors 234 are all in their desired blocking regions 232. This may ensure that no actor 234 is in the way of the show effects. For example, in the illustrated embodiment, one of the show effects 236 may be a large vehicle 240 driving up onto the stage area 230. However, the tracking system 10 may prevent the vehicle 240 from driving onto the stage area 230 until the actors 234 all reach their blocking regions 232.

It should be noted that several blocking regions 232 may be included on the stage area 230, but they do not all have to be covered at the same time. For example, some of the blocking regions 232 may be used at one time in preparation for a first of the show effects 236, while other blocking regions 232 may be used at another time in preparation for a second of the show effects 236. In still other embodiments, the entire stage area 230 may be covered with the retro-reflective markers 24 (e.g., in a grid pattern as shown in FIGS. 5, 7, and 12), and the control unit 18 may be programmed to recognize when the reflected light detected by the detector 16 matches that of the actors standing in their appropriate blocking regions 232 (and no one is in an improper position).

Figure 17:
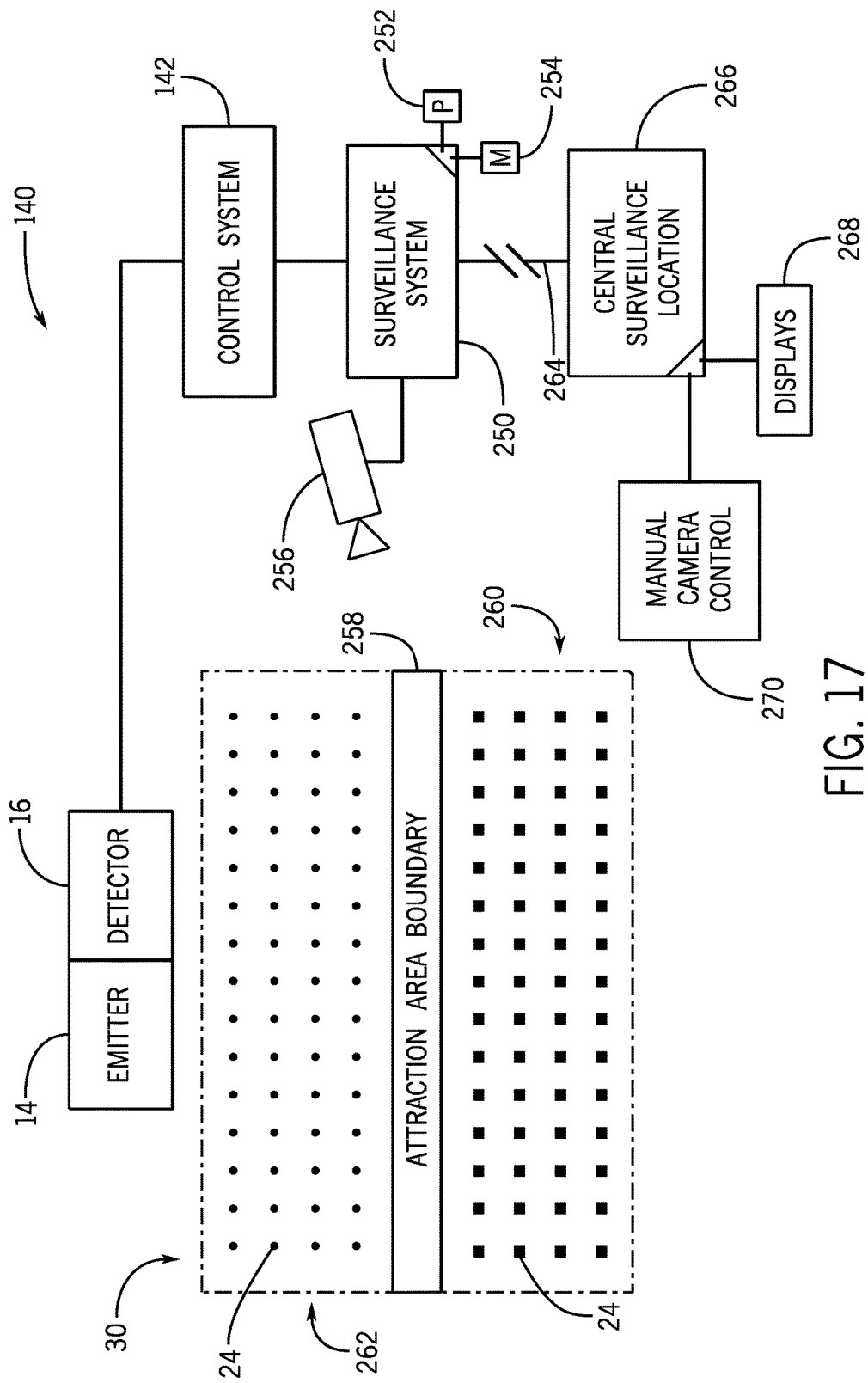
FIG. 17 is a schematic overhead view of an attraction area having a boundary that is monitored using the tracking system of FIG. 1, in accordance with an embodiment of the present disclosure.

Boundary monitoring performed in accordance with the present disclosure is not necessarily limited to automation of ride or show features. Rather, the disclosed tracking system may be utilized with many different systems to enable enhanced functionalities within an amusement park or similar environment. FIG. 17 depicts an overhead view of an embodiment of the amusement park tracking and control system 140 in which the tracking system 10 is integrated with a surveillance system 250. The surveillance system 250 may have an associated set of processing circuitry (e.g., including processor 252 and memory 254) configured to execute various surveillance activities (e.g., for security). In many implementations, the surveillance system 250 may be associated with a control room having various displays and user interfaces that enable one or more individuals to monitor activities within the amusement park, as discussed below.

The surveillance system 250 may include one or more cameras 256 with a view of an attraction area (e.g., an area associated with a particular amusement park attraction), and may particularly have a view of an attraction area boundary 258 positioned between a guest area 260 and a controlled access area 262. The attraction area boundary 258 may be, for example, a gate or similar feature that functions to block guests from entering the controlled access area 262, which may include various equipment and other items that are not intended for guest interaction.

In a typical configuration, observation of the boundary 258 and the controlled access area 262 may be performed by one or more individuals viewing these regions via the camera 256. If a breach of the boundary 258 were detected, then an operator of the surveillance system 250 would have to manually control the camera 256 (e.g., to follow an individual within the controlled access area 262) for further surveillance. Furthermore, any detection of such a breach is dependent on the individual monitoring the areas 260, 262 viewing the monitor at the appropriate time and at the appropriate location.

In the illustrated embodiment, however, the tracking system 10 automatically monitors breach of the attraction area boundary 258 by, for example, detecting blockage of retro-reflective markers 24 within the controlled access area 262. Alternatively or additionally, the tracking system 10 may monitor retro-reflective markers 24 given to guests as wearable items and, upon recognizing such a marker 24 within the controlled access area 262, cause certain automated functions to be performed. Further, any one or a combination of the techniques described above with respect to FIGS. 3-9 may be performed by the tracking system 10. Further still, in certain embodiments, the detector 16 and the camera 256 may be the same device. As an example of the automated actions that may be performed by the system 140, the tracking system 10 may cause the surveillance system 250 to move the camera 256 in accordance with the location of the retro-reflective markers 24 tracked within the controlled access area 262 (or other reflective signature tracked within the controlled access area 262). For instance, the tracking system 10 may cause the camera 256 to zoom in on a particular location, to pan according to the tracked movement, tilt according to the tracked movement, and so on. The tracking system 10 may also cause the processor 252 and memory 254 to store the feed associated with the detected event in a more permanent storage location (e.g., as opposed to a temporary cache) until an operator provides an input that the feed has been reviewed.

In addition, the tracking system 10 may cause the surveillance system 250 to send a feed 264 from the camera 256 to a central surveillance location 266. The central surveillance location 266 may be a location including multiple displays 268, manual camera controls 270, alarm features, and so forth, which operators may access for surveillance purposes. In an embodiment, the tracking system 10 may cause the feed 264 to be directed to a main display to more clearly show and indicate the detected breach event.

Figure 18:
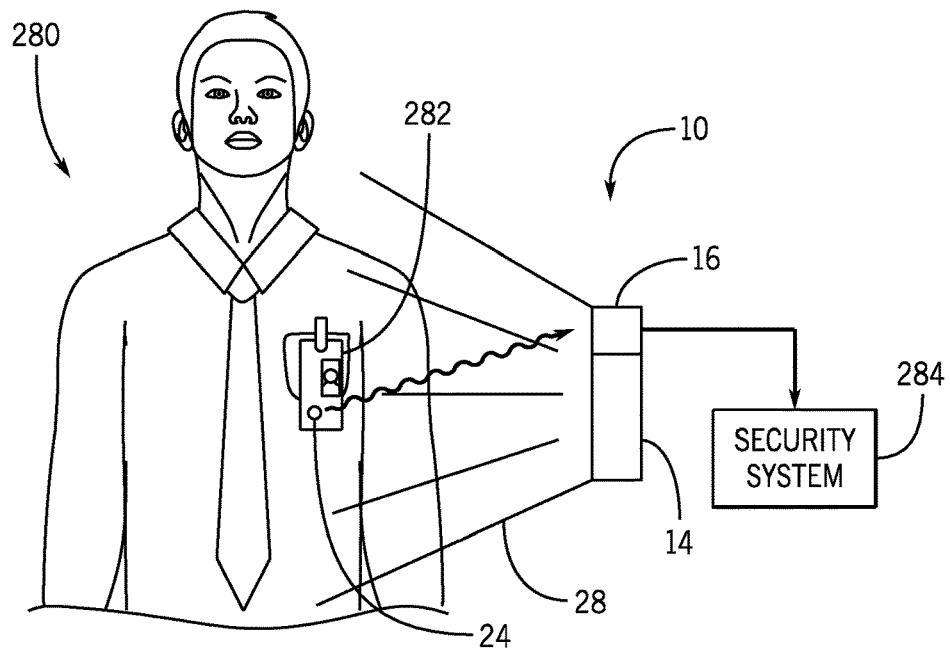
FIG. 18 is a schematic view of the tracking system of FIG. 1 being used to detect security clearance of a person, in accordance with an embodiment of the present disclosure.

The disclosed tracking system 10 may also be used in security allowance systems, for instance to allow particular individuals to cross the boundary 258. As illustrated in FIG. 18, for example, employees 280 may wear hangtags 282 that have the retro-reflective marker 24 designed to reflect the electromagnetic radiation beam 28 from the emitter 14 to the detector 16. The retro-reflective marker 24 on the hangtag 282 may reflect the electromagnetic radiation beam 28 at a particular frequency, and this frequency may be indicative of a security clearance of the employee 280 wearing the hangtag 282. The detector 16 may sense the reflected frequency and send it to a security system 284, which may automatically grant access to the secure area when the detected frequency of light reflected from the hangtag 282 matches a level of security clearance for the controlled access area 262. In some embodiments, the tracking system 10 may also be able to detect, based on a signature stored in memory 22, the presence of a person, with or without the hangtag 282. Thus, the security system 284 may execute instructions to block a person from entering the area 262 (e.g., by maintaining a door in a locked state) when the detected person does not also have a hangtag 282 indicating the proper security clearance. The tracking system 10 may be utilized with other security systems 284, such as those at a larger access gate to a secure area. In this instance, the hangtag 282 may be positioned on a vehicle that is trying to enter the area, not the individual employee 280. The disclosed security system 284 may be a relatively inexpensive way to ensure that a person has proper security clearance to enter an area, without requiring the person to swipe a card, and ensuring that multiple people (one with a hangtag 282 and one without) enter the secure location at the same time. Similar features could be used to control access to an attraction, wherein the hangtag 282 includes a ticket.

The amusement park tracking and control system 140 may also utilize the tracking system 10 to perform certain types of behavioral monitoring and analysis. For example, such monitoring and analysis may be used to control the sale of certain amusement park items, to determine peak times of activity and analyze the manner in which guests might progress through the amusement park between different attractions, and so forth. Indeed, the amusement park tracking and control system 140 may perform these analyses and produce an output to cause automated activities within the amusement park, such as automated updates to pricing of certain items, ticket availability, and so forth.

Figure 19:
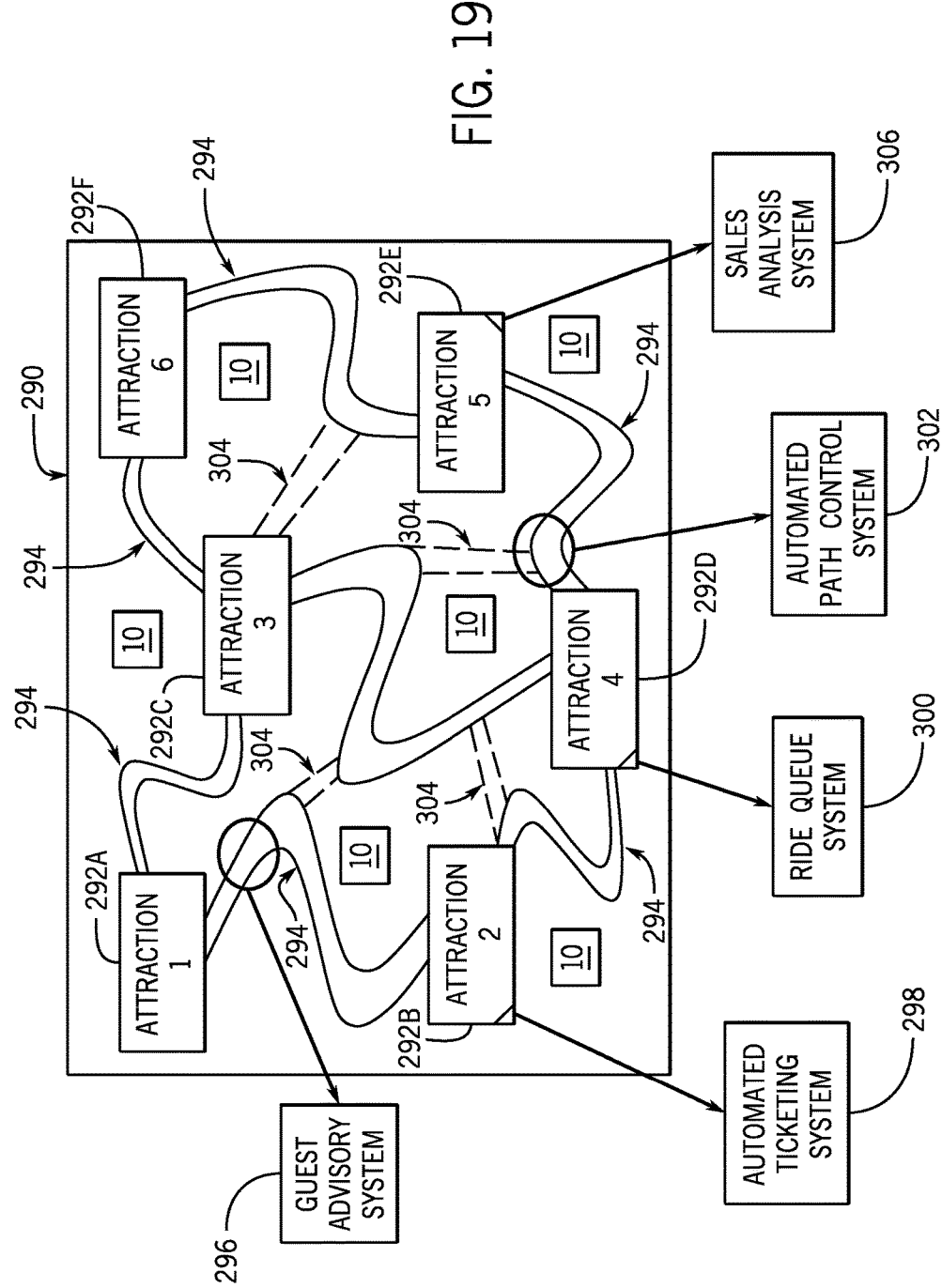
FIG. 19 is a plan view of an amusement park layout having a plurality of attractions connected by guest pathways, the attractions and guest pathways being monitored by the tracking system of FIG. 1 to facilitate control of automated equipment positioned throughout the amusement park, in accordance with an embodiment of the present disclosure.

Various examples of additional ways in which the tracking system 10 may be integrated into an amusement park are depicted in FIG. 19, which is an overhead view of an amusement park layout 290. As illustrated, the amusement park layout 290 includes a plurality of attractions 292, which are coupled together by a series of guest pathways 294 (e.g., paved walkways). As also illustrated, the pathways 294 may be monitored using one or more of the tracking systems 10 of the present disclosure.

In accordance with present embodiments, the tracking systems 10 may monitor guest behavior both within the attractions 292 and along the guest pathways 294. The tracking systems 10 may provide the tracked information relating to guests to the control system 142, which may cause a number of automated functions to be performed based on the tracked behavior. As shown by way of example between the first of the attractions 292 and a second of the attractions 292, a guest advisory system 296 may be positioned along one of the pathways 294 coupling these two attractions 292. The guest advisory system 296 may provide information to the guests traveling along the pathway 294 relating to a variety of aspects of the attractions 292, where the information may be generated, at least in part, based on tracking performed by the tracking systems 10. An example embodiment of the guest advisory system 296 is described in further detail below with respect to FIG. 20.

As shown with respect to the second of the attractions 292, one or more automated ticketing systems 298 may be positioned within the attractions 292. Additionally or alternatively, one or more of the automated ticketing systems 298 may be positioned along the guest pathways 294. In accordance with one aspect of the present disclosure, the automated ticketing systems 298 may be controlled by the control system 142, which monitors tracked information obtained by the tracking system 10 to determine whether tickets of a certain type may be sold, how many of a particular type of ticket may be sold (e.g., for upsale of certain tickets to "VIP" tickets), to encourage sales of particular types of tickets, and so on. As an example, the control system 142 may determine (e.g., based on a number of people located within a loading area of a ride vehicle) whether to increase or decrease a number of ticket sales for one of the attractions 292. As another example, the control system 142 may update a total number of tickets of a particular type to be sold at automated ticket kiosks, may cause automated adjustment of prices of tickets or similar items, and so forth, depending on a number of people waiting in line for one of the attractions 292.

As shown with respect to a fourth attraction 292D, the amusement park layout 290 may also include a ride queue system 300. The ride queue system 300 may function in a similar manner as set forth above with respect to FIG. 13, where certain gates may be opened or closed based on a number of individuals present within a particular line in the loading area 170 (e.g., based on a number of people in a line associated with a front of the ride vehicle 172). Thus, in a general sense, adjustments to the gates may be performed automatically by the control system 142 in response to the evaluated reflection tracking information indicative of a relatively uneven number of people in different portions of the loading area (e.g., in different lines in the loading area).

Figure 20:
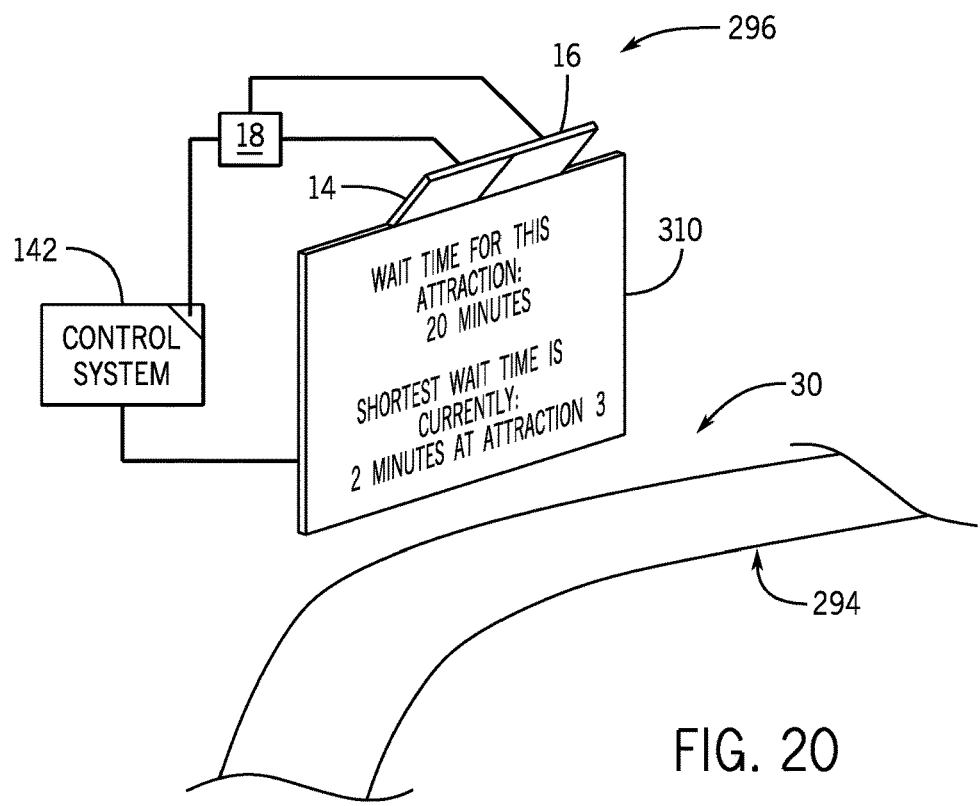
FIG. 20 is an overhead perspective view of an embodiment of a guest advisory system incorporating the tracking system of FIG. 1 and positioned along one or more of the pathways of the amusement park layout of FIG. 19, in accordance with an embodiment of the present disclosure.

Continuing in the counterclockwise direction in FIG. 19, the amusement park layout 290 also includes an automated path control system 302, which is described in further detail below with respect FIG. 20. Generally, the automated path control system 302 may be coupled to or otherwise disposed along one of the guest pathways 294 to enable guests to enter into auxiliary pathways 304 positioned between certain of the attractions 292. Specifically, as illustrated in FIG. 19, the illustrated automated path control system 302 is positioned between the fourth attraction 292D and the fifth attraction 292E to enable guests to move from the pathway 294 extending between the fourth and fifth attractions 292 to a separate pathway 294 positioned between the fourth and third attractions 292.

In accordance with yet another aspect of the present disclosure, the amusement park layout 290 may also include one or more sales analysis systems 306 associated with the attractions 292. The sales analysis systems 306 may function in a similar way as set forth with respect to the automated ticketing system 298, but may be applied to sales of a number of different items, such as merchandise associated with a particular theme at one of the attractions 292, clothing, and so forth.

As described above, FIG. 20 depicts an embodiment of the guest advisory system 296, which may be disposed along one or more of the guest pathways 294 positioned between certain of the attractions 292. In the illustrated embodiment of FIG. 20, the guest advisory system 296 includes elements of the tracking system 10, including one or more of the emitters 14, or more of the detectors 16, and the control unit 18 communicatively coupled to the emitter 14 and the detector 16. Again, the control unit 18 may be communicatively coupled to or may be a part of the control system 142. As also shown, the guest advisory system 296 also includes a display 310, which is positioned along the guest pathway 294. In particular, the display 310 is configured to provide visual information to guests traveling along the pathway 294 between the attractions 292. The display 310 may provide a variety of different information, which may be updated and/or determined by the control system 142 in response to tracking performed by the tracking systems 10 disposed throughout the amusement park.

As one example and as illustrated, the display 310 may include text or some other indicia providing information relating to a wait time for particular attraction 292, as well as information relating to which of the attractions 292 may have the shortest wait time within the amusement park. In other embodiments, a recommendation may be provided depending on an analysis of reflected light emanating from the pathway 294, for example as a result of different signatures of reflection resulting from children, adults, or other objects such as strollers, carts, and so forth. For example, the guest advisory system 296 may generate a recommended attraction area for children when the control system 142 identifies reflective patterns indicative of a family with small children. Additionally or alternatively, the guest advisory system 296 may be configured to provide an interface for guests. For example, a guest may use their hands to navigate through various options presented on the display 310 to obtain directions to a particular attraction 292, to obtain a recommendation based on wait times, and so forth. This functionality may be enabled by the tracking system 10, where the detector 16 tracks movement of a guest's hand and/or object within the guest's hand relative to known locations on the display 310. The tracking system 10 may track movements associated with navigation through screens shown by the display 310, and provide visual outputs as appropriate. In yet a further embodiment, the display 310 may be used for entertainment purposes as well. For example, the tracking system 10 may detect that an individual has made a "shadow animal" with their hands and, in response, may provide an image of the animal as a result.

Figure 21:
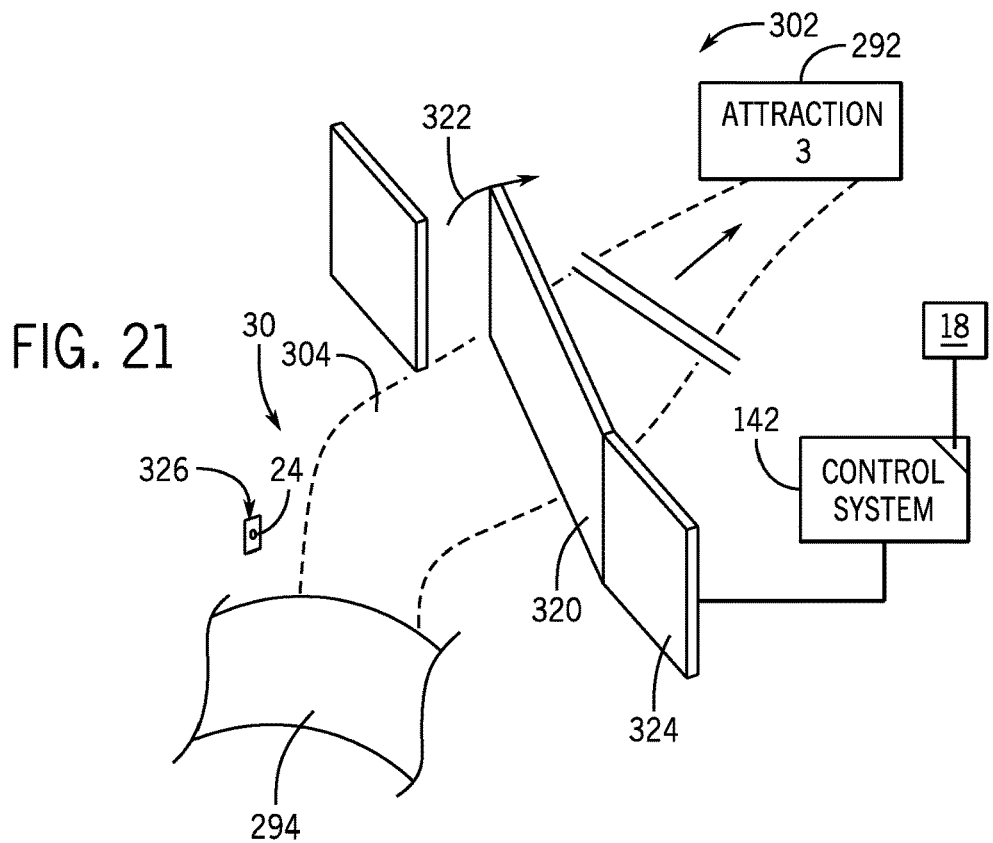
FIG. 21 is an overhead perspective view of an embodiment of an automated pathway control system incorporating the tracking system of FIG. 1 and positioned along one or more of the pathways of the amusement park layout of FIG. 19 and enabling access to an auxiliary pathway, in accordance with an embodiment of the present disclosure.

The guest advisory system 296 is also not particularly limited to providing visual information. In accordance with present embodiments, the guest advisory system 296 may, in addition to or as an alternative to providing visual information, provide audible indications of wait times, attraction recommendations, or other information that a guest might find useful. The guest advisory system 296 may be used to provide any information to the guests which may be useful to enhance flow of foot traffic through the amusement park. In this regard, FIG. 21 illustrates an embodiment of the automated path control system 302, which is depicted as including a movable gate 320 which, in its closed position, blocks the auxiliary path 304. The movable gate 320 may be moved from the closed position to an open position, as generally depicted by arrow 322, to provide guests access to the auxiliary pathway 304, which may be considered to be a shortcut to another one of the attractions 292. Control of the movable gate 320 may be performed based on a number of different analyses performed by the control system 142, including analyses based on tracking information obtained from one or more tracking systems 10 disposed throughout the amusement park.

As one example of the control of the movable gate 320, the control system 142 may obtain tracking information relating to people walking or otherwise traveling along the guest pathway 294. As a result of this tracking, the control system 142 may send a control signal to certain control elements (e.g., present within a fixed environmental structure 324) to open the gate 320. This tracking information may include, by way of example, a number of detected individuals walking along the pathway 294, a specially marked ticket 326 or similar item fitted with one or more of retro-reflective markers 24, or the like. In certain embodiments, the control system 142 may open the auxiliary pathway 304, for example, to relieve congestion at a particular one or more of the attractions 292 as well as to relieve foot traffic along one or more of the pathways 294. Indeed, by providing guests with alternative routes through the amusement park, the control system 142 may facilitate a continuous flow throughout the park and facilitate even distribution of visitors at the different attractions 292.

There may be other features disposed along the guest pathways 294 that may also utilize the disclosed tracking system 10. Indeed, the disclosed tracking system 10 may be used to track combinations of people 70, objects 32, etc., based on different characteristics of reflected light (e.g., whether the reflection is specular, diffuse, or retro-reflection, or based on the reflected wavelengths). In this way, the tracking system 10 may be considered to track multiple reflection patterns that may be useful for multiple automated processes, which may be related or entirely separate from one another. For example, it may be desirable to position small booths along the pathways 294 for additional guest entertainment, for selling merchandise, and so forth.

Figure 22:
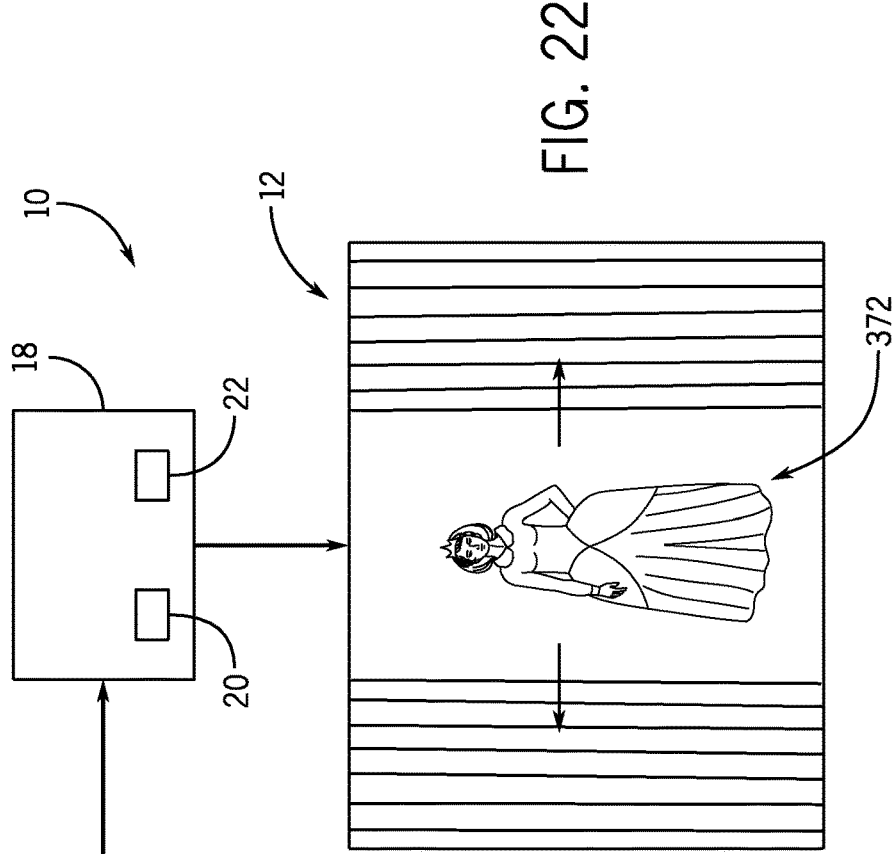
FIG. 22 is a perspective view of a playing card with a retro-reflective marker disposed thereon for use in an amusement attraction utilizing the tracking system of FIG. 1, in accordance with an embodiment of the present disclosure.

For example, as discussed above, the tracking system 10 may control amusement park equipment 12, such as effect devices. The effect devices may be triggered by the control unit 18 in response to pattern detection relating to, for instance, the detection of certain retro-reflective markers 24. It is now recognized that these techniques may be applied to various types of interactive games disposed along the pathways 294. For example, as illustrated in FIG. 22, the tracking system 10 may enhance an interactive playing card game or magic trick by triggering the amusement park equipment 12. In the illustrated embodiment, a user holds a playing card 370 within the detection area 30 of the tracking system 10. The playing card 370 includes the retro-reflective marker 24, and it may be selected from a deck of playing cards having similar retro-reflective markers 24. Each of the retro-reflective markers 24 in the deck may reflect the emitted electromagnetic radiation at a different frequency, and the control unit 18 is configured to determine which playing card 370 is held by the user. Based on the detected playing card 370, the control unit 18 may trigger the effect device 18 to generate a corresponding effect. For example, as illustrated, the playing card 370 in the user's hand is a queen and, thus, the control unit 18 triggers the amusement park equipment 12 to display an animation 372 (e.g., curtains parting to reveal a queen) corresponding to the particular playing card 370. This type of system may be used during magic tricks where a magician guesses or otherwise responds to the card held in the user's hand.

Figure 23:
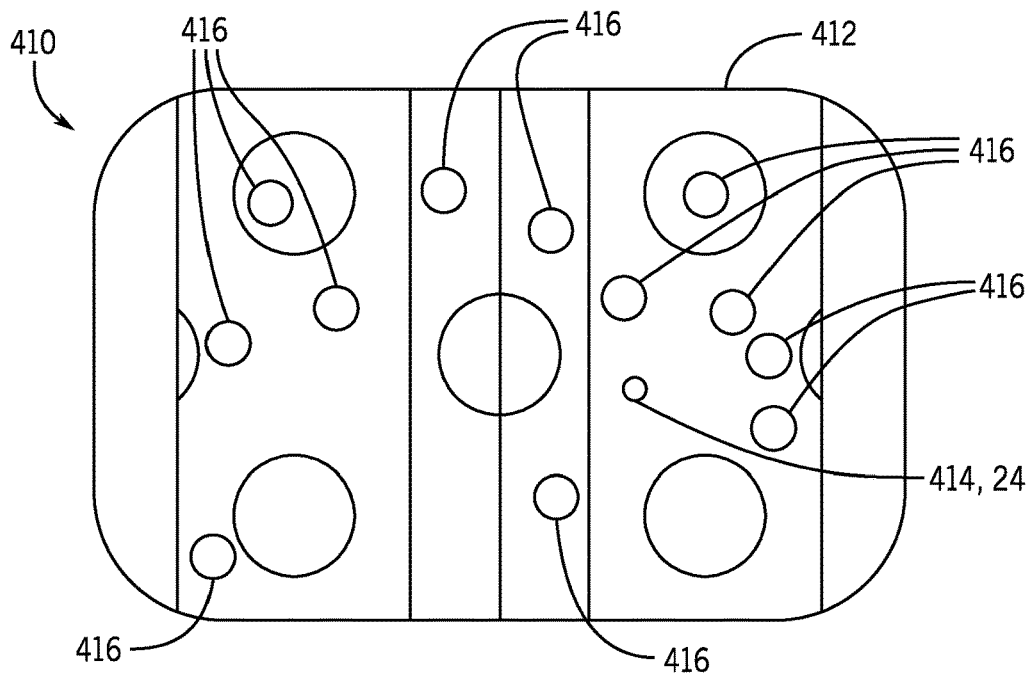
FIG. 23 is an overhead schematic view of a hockey game where the tracking system of FIG. 1 is used to track a puck, in accordance with an embodiment of the present disclosure.

Several uses for the disclosed tracking system 10 have been described above within the context of amusement park attractions. However, it should be noted that several other technology areas may benefit from the use of the tracking system 10. For example, the tracking system 10 may be used within athletic or sports contexts (e.g., sporting events, equipment, training tools). For example, FIG. 23 is an overhead view of a hockey game 410 that may be monitored via the tracking system 10 described above. The disclosed tracking system 10 may be positioned above the hockey game 410 such that an entire hockey rink 412 is within the detection area 30 of one or more emitter/detector pairs of the tracking system 10. The tracking system 10 may track a location of a puck 414 in the hockey rink 412. In some embodiments, the puck 414 may include the retro-reflective marker 24 (e.g., as a coating or solid marker) for reflecting the emitted electromagnetic radiation back toward the detector 16 of the tracking system 10. In other embodiments, the control unit 18 of the tracking system 10 may be configured to identify the puck 414 based on an electromagnetic signature of the puck 414 that is different from that of the markings on the rink 412 and any players 416 on the rink 412. The tracking system 10 may enable relatively accurate tracking of the puck 414 within the rink 412, as compared to a typical camera (e.g., including those used in a television broadcast). The control unit 18 of the tracking system 10 may communicate this accurate location of the puck 414 to television adapting and/or broadcasting equipment, in order to add a marker or indicator following the detected location of the puck 414 over a live television broadcast of the hockey game 410. It should be noted that similar techniques for tracking 10 a puck, ball, or other sports equipment may be applied to different sporting events as well. For example, the tracking system 10 may be used on a golf course to track the location of a golf ball and to overlay a marker or other indicator of the location of the golf ball onto a live television broadcast for better visibility of the golf ball location.

Figure 24:
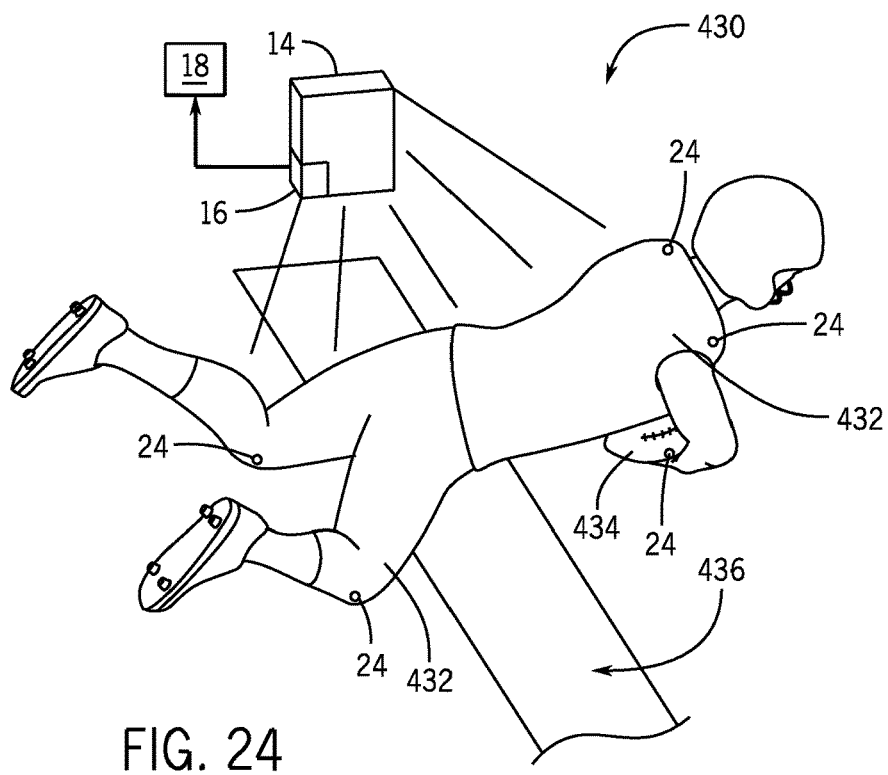
FIG. 24 is a perspective view of a sports game with retro-reflective markers positioned on a player, a ball, and a goal line for use with the tracking system of FIG. 1, in accordance with an embodiment of the present disclosure.

Other applications may exist for using the tracking system 10 at live sporting events. For example, the tracking system 10 may be used as part of a sports analysis system to determine or evaluate certain play calls made during a sporting event. FIG. 24 illustrates one example of a sports analysis system 430 that utilizes the tracking system 10 to make determinations relating to play calls at a football game. Specifically, the sports analysis system 430 may include retro-reflective markers 24 embedded in a jersey 432 that a player is wearing. In some embodiments, these retro-reflective markers 24 may be different for each of the different players on the field. That way, the tracking system 10 may be able to identify and track the locations of specific players on the field.

In addition, retro-reflective markers 24 or coatings may be applied to a ball 434 in play and/or field markings 436 (e.g., goal line, out of bounds line). By tracking the retro-reflective markers 24 on the ball 434 and on the individual players' jerseys 432, the control unit 18 may determine how many yards a given player has run with the ball 434 during a game. In some embodiments, the sports analysis system 430 may be used for play call determination. For example, as illustrated, the retro-reflective markers 24 may be embedded in particular locations of a player's jersey 432 (e.g., knee pads, shoulder pads), on the ball 434, and along the field markings 436 so that the tracking system 10 may determine whether the ball 434 crossed the field marking 436 (e.g., end zone line) before the player's knee hit the ground. The places where the retro-reflective markers 24 are embedded on a player's jersey 432 or on the field may be different for different sports. In addition, the control unit 18 may use different algorithms and different combinations of available retro-reflective marker locations to determine play calls based on the location of the ball 434 along the field, the current play of the game, or a requested evaluation of a play.

Figure 25:
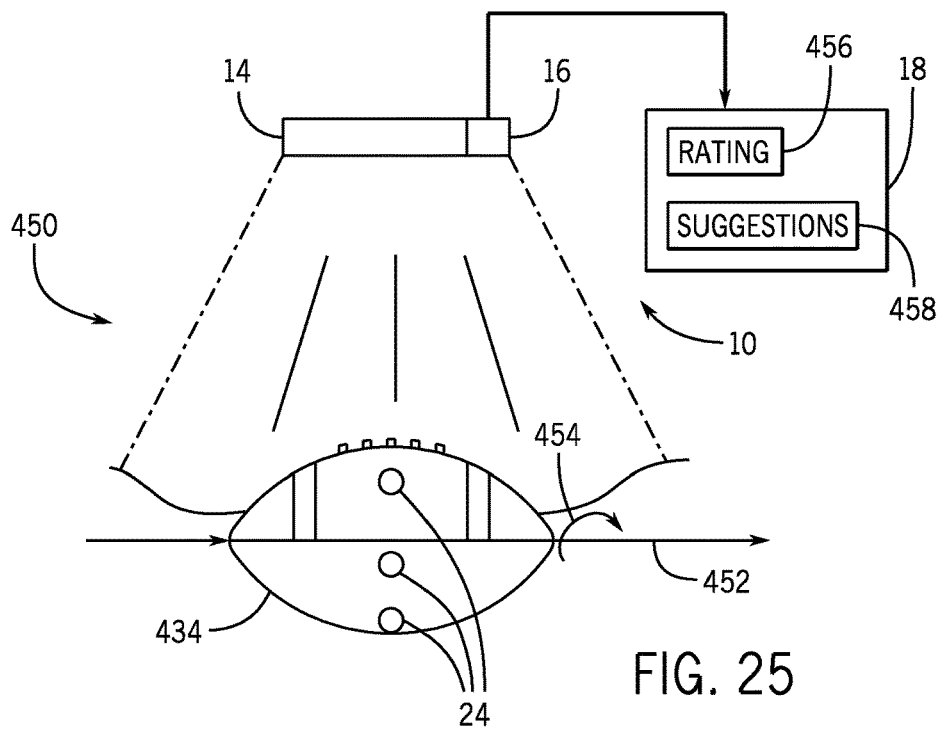
FIG. 25 is a schematic representation of a ball with retro-reflective markers being thrown such that the movement of the ball is tracked by the tracking system of FIG. 1, in accordance with an embodiment of the present disclosure.

In still other embodiments, the tracking system 10 may be used in the context of a sports training feedback mechanism 450, as illustrated in FIG. 25. Specifically, the tracking system 10 may be used to track a location of retro-reflective markers 24 disposed on sports equipment, such as the ball 434. Although illustrated as a football, the sports equipment on which the retro-reflective markers 24 are disposed may be any other type of ball, mitt, bat, club, racket, or other piece of equipment that is designed to be manipulated in the context of a sport. Based on the locations of the retro-reflective markers 24, the tracking system 10 may be configured to evaluate the manipulation of the sports equipment and/or athlete (e.g., arms) by comparing it to a predetermined and desirable path stored in the memory 22 (see FIG. 1) of the control unit 18. For example, the memory 22 may include a path corresponding to a perfect spiral of a football. The control unit 18 may compare the path of the retro-reflective markers 24 on the illustrated ball 434, as it travels in a direction of its axis 452 while spiraling 454 around its axis 452, to the path stored in the memory 22. Based on this comparison, the control unit 18 may output a rating 456 or a list of one or more suggestions 458 for improving the performance of the player. Thus, the tracking system 10 may provide an unobstructed feedback mechanism that allows athletes a feedback loop for practicing (e.g., throwing a perfect spiral or swinging a golf club). In some embodiments, the tracking system may be configured to determine, based on a signature matching the type of equipment in use (e.g., football), the location and orientation of the equipment without the use of retro-reflective markers 24.

In a similar manner, the tracking system 10 may be used to monitor physiological aspects of people in certain activities, such as in physical therapy settings. For example, one or more of the retro-reflective markers 24 may be positioned on clothing or other article so that the tracking system 10 is able to monitor movement of the retro-reflective markers 24 in relation to certain therapeutic movements. Thus, the tracking system 10, using the retro-reflective markers 24 (or not), may monitor a person's movement and provide feedback that encourages the person to accurately execute the therapeutic movement. For example, the tracking system 10 may monitor a person's joints and compare the movement of the joints to a known range of motion for the particular joint having a similar size and shape to the tracked joint. The tracking system 10 may then cause automated equipment 12 to provide visual, audible, and/or tactile feedback to the person in therapy.

In addition to amusement park attractions, sporting events, and so forth, the tracking system 10 may be used to monitor and/or increase efficiency within the workplace. More specifically, the tracking system 10 may be utilized to evaluate operator action efficiency. As an example, FIG. 26 illustrates an embodiment of the tracking system 10 being utilized to detect and notify hotel staff of rooms 510 that need to be serviced within a hotel. A hallway 512 (or portion of a hallway) may be equipped with a single tracking system 10 having an emitter that emits the electromagnetic radiation to the doorways of all the rooms 510 on the hallway 512. Guests at the hotel may place hangtags 514 on the doors of their rooms 510 to notify hotel staff of certain requests (e.g., service the room, do not disturb, etc.). Each hangtag 514 may be equipped with retro-reflective markers 24 that reflect the light from the emitter 14. The hangtags 514 for different requests (e.g., service the room, do not disturb) may have retro-reflective markers 24 that reflect the light at different frequencies, thus allowing the tracking system 10 to determine what requests are being made from the hangtags 514 out on the hallway 512. As a result, the tracking system 10 may provide a signal to a hotel servicing alert system 516 when service is requested. This may streamline and increase the efficiency of the hotel staff servicing the rooms 510, since they will focus directly on the rooms 510 that are requesting service instead of those rooms 510 of guests who do not want to be disturbed.

The tracking system 10 may also be used to evaluate an efficiency of individual workers within a workspace 530, as illustrated in FIG. 27. The workspace 530 may include multiple tracking systems 10 located through the different offices 532 and hallways of the workspace 530, and these tracking systems 10 may track the locations of employees 536 within the workspace 530. Specifically, the employees 536 may wear a name badge or other article of clothing with a retro-reflective marker 24, and each employee 536 may have a retro-reflective marker that reflects light at a different frequency from the others. Thus, the tracking system 10 may collect and output information relating to the location of each employee throughout the day. In some embodiments, the retro-reflective markers 24 may all be the same for the different employees 536, or the tracking system 10 may generally track locations of the employees 536 through the workspace 530 using a signature that matches that of employees 536 moving about the workspace 530. Such detection may not be specific to a single employee 536, but instead the locations may be analyzed to determine whether the employees 536 in the workspace as a whole are being less efficient (e.g., spending too much time in a break room 538).

The tracking system 10 may also provide a signal to a lighting system in the workspace 530 to turn off the lights in a particular office 532 when no employees 536 have been detected in that office (e.g., office 540) after a predetermined amount of time. This may conserve energy within the workspace 530 by turning off the lights when the office 540 is not in use. In addition, this energy conservation process may be accomplished using the same tracking system that is simultaneously being used to determine a location of employees 536 for workspace efficiency determinations.

While only certain features of the present embodiments have been illustrated and described herein, many modifications and changes will occur to those skilled in the art. It is, therefore, to be understood that the appended claims are intended to cover all such modifications and changes as fall within the true spirit of the invention.

The invention claimed is:

1. An amusement park tracking and control system, comprising:
   an emission subsystem comprising one or more emitters, wherein the one or more emitters is configured to flood a guest attraction area of an amusement park attraction with electromagnetic radiation;
   a plurality of retro-reflective markers comprising a first set of retro-reflective markers positioned within a proximity region of a ride vehicle in the guest attraction area and a second set of retro-reflective markers positioned outside of the proximity region of the ride vehicle, wherein the proximity region of the ride vehicle is defined by a threshold distance between a retro-reflective marker of the plurality of retro-reflective markers and the ride vehicle, and wherein a first retro-reflective marker of the first set of retro-reflective markers and a second retro-reflective marker of the second set of retro-reflective markers comprise different retro-reflective coatings, such that different wavelengths of the electromagnetic radiation are reflected by the first and second retro-reflective markers to produce a first pattern of reflection and a second pattern of reflection, respectively;
   a detection subsystem comprising one or more optical filters, wherein the one or more optical filters is configured to filter electromagnetic radiation not retro-reflected from within the guest attraction area by utilizing directionality associated with the electromagnetic radiation retro-reflected within the guest attraction area; and a control system comprising processing circuitry configured to receive data indicative of electromagnetic radiation reflection from the plurality of retro-reflective markers and to monitor the electromagnetic radiation reflection by the plurality of retro-reflective markers for a change from a first pattern of electromagnetic radiation reflection by the plurality of retro-reflective markers to a second pattern of electromagnetic radiation reflection by the plurality of retro-reflective markers; and wherein the processing circuitry of the control system is configured to evaluate information relating to a proximity of a person in the guest attraction area to the ride vehicle based on changes in the monitored electromagnetic radiation reflection, to generate an output to control the ride vehicle within the guest attraction area based on the evaluated information, and to determine whether any of the first set of retro-reflective markers or the second set of retro-reflective markers are blocked from receiving or reflecting emitted electromagnetic radiation based on the change from the first pattern of electromagnetic radiation reflection to the second pattern of electromagnetic radiation reflection.

2. The system of claim 1, wherein a third set of retro-reflective markers of the plurality of retro-reflective markers is positioned on environmental elements of the guest attraction area, and wherein the processing circuitry of the control system is configured to assume that the change from the first pattern of reflection by the plurality of retro-reflective markers to the second pattern of reflection by the plurality of retro-reflective markers corresponds to a change in positioning of the person relative to the environmental elements.

3. The system of claim 1, wherein a third set of retro-reflective markers of the plurality of retro-reflective markers is positioned on environmental elements of the guest attraction area, and the processing circuitry of the control system is configured to evaluate the information by correlating portions of the first pattern of reflection no longer present in the second pattern of reflection to the information relating to the proximity of the person in the guest attraction area to the ride vehicle.

4. The system of claim 3, wherein the processing circuitry of the control system is configured to correlate the portions of the first pattern of reflection no longer present in the second pattern of reflection to a grouping of retro-reflective markers within the third set of retro-reflective markers of the plurality of retro-reflective markers that are blocked from receiving or reflecting emitted electromagnetic radiation by the person in the guest attraction area.

5. The system of claim 4, wherein the processing circuitry of the control system is configured to identify a position of the person in the guest attraction area based on a stored position of the grouping of retro-reflective markers within the third set of retro-reflective markers that are blocked from receiving or reflecting emitted electromagnetic radiation by the person in the guest attraction area, and to trigger an attraction feature based on the identified position.

6. The system of claim 5, wherein the processing circuitry of the control system is configured to automatically trigger a show effect, dispatch a ride vehicle, or open an access gate, once the identified position is within the proximity region.

7. The system of claim 6, wherein the processing circuitry of the control system is configured to automatically trigger the show effect, dispatch the ride vehicle, or open the access gate, once the identified position is determined to have first been inside of the proximity region, and then moved outside of the proximity region.

8. The system of claim 1, wherein when the control system determines that at least some of the retro-reflective markers within the proximity region are blocked, the control system has a first output that prevents departure of the ride vehicle, and when the control system determines that none of the retro-reflective markers within the proximity region are blocked, the control system has a second output that automatically causes departure of the ride vehicle.

9. A method of operating an amusement park attraction, comprising:

flooding a guest attraction area of the amusement park attraction with electromagnetic radiation using an emission subsystem comprising one or more emitters;

reflecting the electromagnetic radiation from the emission subsystem using a plurality of retro-reflective markers within the guest attraction area, wherein a first retro-reflective marker is positioned within a proximity region of a ride vehicle in the guest attraction area and a second retro-reflective marker is positioned outside of the proximity region of the ride vehicle, and wherein the proximity region of the ride vehicle is defined by a threshold distance between a retro-reflective marker of the plurality of retro-reflective markers and the ride vehicle, wherein the first and second retro-reflective markers comprise different retro-reflective coatings such that different wavelengths of the electromagnetic radiation are reflected by the first and second retro-reflective markers to produce a first pattern of reflection and a second pattern of reflection, respectively;

monitoring electromagnetic radiation retro-reflected from within the guest attraction area for a change from a first pattern of electromagnetic radiation reflection by the plurality of retro-reflective markers to a second pattern of electromagnetic radiation reflection by the plurality of retro-reflective markers;

filtering electromagnetic radiation not retro-reflected from within the guest attraction area using a detection subsystem having one or more optical filters, wherein the one or more optical filters is configured to filter electromagnetic radiation not retro-reflected from within the guest attraction area by utilizing directionality associated with the electromagnetic radiation retro-reflected within the guest attraction area;

determining whether the first retro-reflective marker or the second retro-reflective marker is blocked from receiving or reflecting emitted electromagnetic radiation based on the change from the first pattern of electromagnetic radiation reflection to the second pattern of electromagnetic radiation reflection;

evaluating information relating to a proximity of one or more persons in the guest attraction area to the ride vehicle with a control system communicatively coupled to the detection subsystem based on the change in the monitored electromagnetic radiation reflection; and controlling the ride vehicle within the guest attraction area based on the evaluated information using the control system.

10. The method of claim 9, wherein controlling the ride vehicle within the guest attraction area based on the evaluated information comprises controlling the ride vehicle based on an evaluated position of the one or more persons in the guest attraction area, wherein the evaluated position is determined by the control system based on the change in the monitored electromagnetic radiation reflection.

11. The method of claim 10, wherein evaluating information relating to a proximity of the one or more persons in the guest attraction area to the ride vehicle comprises comparing the first pattern of electromagnetic radiation reflection to the second pattern of electromagnetic radiation reflection to identify differences between the first pattern of electromagnetic radiation reflection and the second pattern of electromagnetic radiation reflection, and correlating the identified differences to movement of the one or more persons with respect to the ride vehicle.

12. The method of claim 11, comprising reflecting the electromagnetic radiation from the emission subsystem using third retro-reflective markers of the plurality of retro-reflective markers positioned on wearable items worn by individuals in the guest attraction area, and estimating changes in respective positions of the third retro-reflective markers based on the identified differences between the first pattern of electromagnetic radiation reflection and the second pattern of electromagnetic radiation reflection using the control system.

13. The method of claim 12, comprising triggering an attraction feature based on an estimated position of the third retro-reflective markers using the control system.

14. The method of claim 11, comprising reflecting the electromagnetic radiation from the emission subsystem using third retro-reflective markers of the plurality of retro-reflective markers positioned on environmental elements in the guest attraction area, and estimating respective positions of the one or more persons based on the identified differences between the first pattern of electromagnetic radiation reflection and the second pattern of electromagnetic radiation reflection using the control system.

15. The method of claim 14, comprising triggering an attraction feature based on the estimated respective positions of the one or more persons using the control system.

16. The method of claim 14, comprising causing a surveillance system to automatically trigger observation of a controlled access zone using the control system when the control system determines, based on portions of the first pattern of electromagnetic radiation reflection no longer present in the second pattern of electromagnetic radiation reflection, that certain of the third retro-reflective markers are blocked by the one or more persons located within the controlled access zone, and moving a camera of the surveillance system in accordance with a position of the third retro-reflective markers that are blocked by the one or more persons located within the controlled access zone.

17. The method of claim 10, comprising determining a third pattern of reflection from third retro-reflective markers of the plurality of retro-reflective markers and comparing the determined third pattern with a previously determined pattern to identify differences between the determined third pattern and the previously determined pattern, and correlating the identified differences to a length of a queue of guests waiting to purchase an item from a kiosk comprising control circuitry that controls a quantity of the item able to be purchased, and updating the quantity, using the control system and the kiosk, based at least in part on the determined length of the queue.

18. The method of claim 9, comprising:
reflecting the electromagnetic radiation from the emission subsystem using third retro-reflective markers of the plurality of retro-reflective markers positioned on environmental elements in the guest attraction area;
estimating one or more parameters of the one or more persons based on an identified difference between a detected pattern of reflection from the third retro-reflective markers and a stored pattern of reflection from the third retro-reflective markers using the control system;
correlating the one or more parameters to a size requirement of an amusement ride using the control system;
providing an advisory, using a guest advisory system and the control system, to the one or more persons if the one or more parameters are not in compliance with the size requirement.

19. The method of claim 9, comprising:
reflecting the electromagnetic radiation from the emission subsystem using a plurality of third retro-reflective markers of the plurality of retro-reflective markers, each third retro-reflective marker of the plurality of third retro-reflective markers being positioned at a different respective location on a stage of the guest attraction area;
monitoring, using the control system, the plurality of third retro-reflective markers for changes in reflective patterns from each of the third retro-reflective markers to evaluate whether actors on the stage are appropriately positioned relative to an attraction feature;
controlling the attraction feature based on the changes in the reflective patterns using the control system.

20. The method of claim 9, comprising:
reflecting the electromagnetic radiation from the emission subsystem using third retro-reflective markers of the plurality of retro-reflective markers disposed on a control panel of an attraction area to produce reflective patterns;
monitoring reflection of the electromagnetic radiation from the third retro-reflective markers for the change in the monitored electromagnetic radiation reflection, wherein the change in the monitored electromagnetic radiation reflection is indicative of one or more third retro-reflective markers being covered by an operator;
comparing, using the control system, the change in the monitored electromagnetic radiation reflection to patterns stored in a memory of the control system to determine whether the change in the monitored electromagnetic radiation reflection is indicative of a control input;
controlling an attraction feature, using the control system, when the control system identifies that the change in the monitored electromagnetic radiation reflection is indicative of the control input.

* * * * *